US008673510B2

(12) United States Patent
Pledger

(10) Patent No.: US 8,673,510 B2
(45) Date of Patent: Mar. 18, 2014

(54) SYSTEMS AND METHODS FOR MAINTAINING HYDROGEN-SELECTIVE MEMBRANES DURING PERIODS OF INACTIVITY

(75) Inventor: William A. Pledger, Bend, OR (US)

(73) Assignee: DCNS SA, La Montagne (FR)

( * ) Notice: Subject to any disclaimer, the term of this patent is extended or adjusted under 35 U.S.C. 154(b) by 513 days.

(21) Appl. No.: 12/901,987

(22) Filed: Oct. 11, 2010

(65) Prior Publication Data
US 2012/0088168 A1   Apr. 12, 2012

(51) Int. Cl.
H01M 8/04 (2006.01)
H01M 8/06 (2006.01)
B01D 59/12 (2006.01)

(52) U.S. Cl.
USPC .......... 429/416; 429/428; 429/429; 429/423; 429/443; 429/444; 95/55

(58) Field of Classification Search
None
See application file for complete search history.

(56) References Cited

U.S. PATENT DOCUMENTS

| | | |
|---|---|---|
| 2,824,620 A | 2/1958 | De Rosset |
| 3,336,730 A | 8/1967 | McBride et al. |
| 3,338,681 A | 8/1967 | Kordesch |
| 3,350,176 A | 10/1967 | Green et al. |
| 3,469,944 A | 9/1969 | Bocard et al. |
| 3,522,019 A | 7/1970 | Buswell et al. |
| 3,655,448 A | 4/1972 | Setzer |
| 4,098,959 A | 7/1978 | Fanciullo |
| 4,098,960 A | 7/1978 | Gagnon |
| 4,175,165 A | 11/1979 | Adlhart |
| 4,214,969 A | 7/1980 | Lawrance |
| 4,468,235 A | 8/1984 | Hill |
| 5,084,073 A * | 1/1992 | Prasad ............................... 95/52 |
| 5,240,473 A | 8/1993 | Carolan et al. |
| 5,401,589 A | 3/1995 | Palmer et al. |
| 5,432,710 A | 7/1995 | Ishimaru et al. |
| 5,637,414 A | 6/1997 | Inoue et al. |
| 5,733,435 A | 3/1998 | Prasad et al. |
| 5,861,137 A | 1/1999 | Edlund |
| 5,997,594 A | 12/1999 | Edlund et al. |

(Continued)

OTHER PUBLICATIONS

Musket, R.G., Effects of Contamination on the Interaction of Hydrogen Gas with Palladium: A Review, *Journal of Less-Common Metals*, 45, 173-183 (1976).

(Continued)

*Primary Examiner* — Ula C Ruddock
*Assistant Examiner* — Matthew Van Oudenaren
(74) *Attorney, Agent, or Firm* — Dascenzo Intellectual Property Law, P.C.

(57) ABSTRACT

The present disclosure is directed to systems and methods for maintaining hydrogen-selective membranes during periods of inactivity. These systems and methods may include heating and maintaining at least the hydrogen-selective membrane of a hydrogen-producing fuel processing system in a thermally buffered state and/or controlling the chemical composition of the gas streams that may come into contact with the hydrogen-selective membrane. Controlling the chemical composition of the gas streams that may come into contact with the hydrogen-selective membrane may include maintaining a positive pressure of an inert, blanket, reducing, and/or non-oxidizing gas within the membrane separation assembly and/or periodically supplying a reducing gas stream to the membrane separation assembly. These systems and methods may further include periodically supplying a feed stream to a hydrogen-producing region of the hydrogen-producing fuel processing system to produce a mixed gas stream and supplying the mixed gas stream to the membrane separation assembly.

33 Claims, 4 Drawing Sheets

(56) References Cited

U.S. PATENT DOCUMENTS

| | | |
|---|---|---|
| 6,083,637 A | 7/2000 | Walz et al. |
| 6,221,117 B1 | 4/2001 | Edlund et al. |
| 6,319,306 B1 | 11/2001 | Edlund et al. |
| 6,376,113 B1 | 4/2002 | Edlund et al. |
| 6,383,670 B1 | 5/2002 | Edlund et al. |
| 6,494,937 B1 | 12/2002 | Edlund et al. |
| 6,495,277 B1 | 12/2002 | Edlund et al. |
| 6,562,111 B2 | 5/2003 | Edlund et al. |
| 2004/0194384 A1 | 10/2004 | Nguyen |
| 2005/0008909 A1 | 1/2005 | Kaye et al. |
| 2005/0106431 A1* | 5/2005 | Edlund et al. ............ 429/22 |
| 2005/0106445 A1 | 5/2005 | Mitchell et al. |
| 2007/0093382 A1* | 4/2007 | Vanderspurt et al. ......... 502/304 |
| 2007/0180991 A1 | 8/2007 | Chellappa et al. |
| 2010/0136453 A1 | 6/2010 | Edlund |

OTHER PUBLICATIONS

Roa et al., The Effect of Air Exposure on Palladium—Copper Composite Membranes, *Applied Surface Science*, 240, 85-104 (2005).

Way, J.D., Palladium/Copper Alloy Composite Membranes for High Temperature Hydrogen Separation from Coal-Derived Gas Streams, Annual Progress Report for DOE Grant DE-FG26-99FT40585.

Way, J.D., Palladium/Copper Alloy Composite Membranes for High Temperature Hydrogen Separation, Annual Progress Report for DOE Grant DE-FG26-03NT41792.

\* cited by examiner

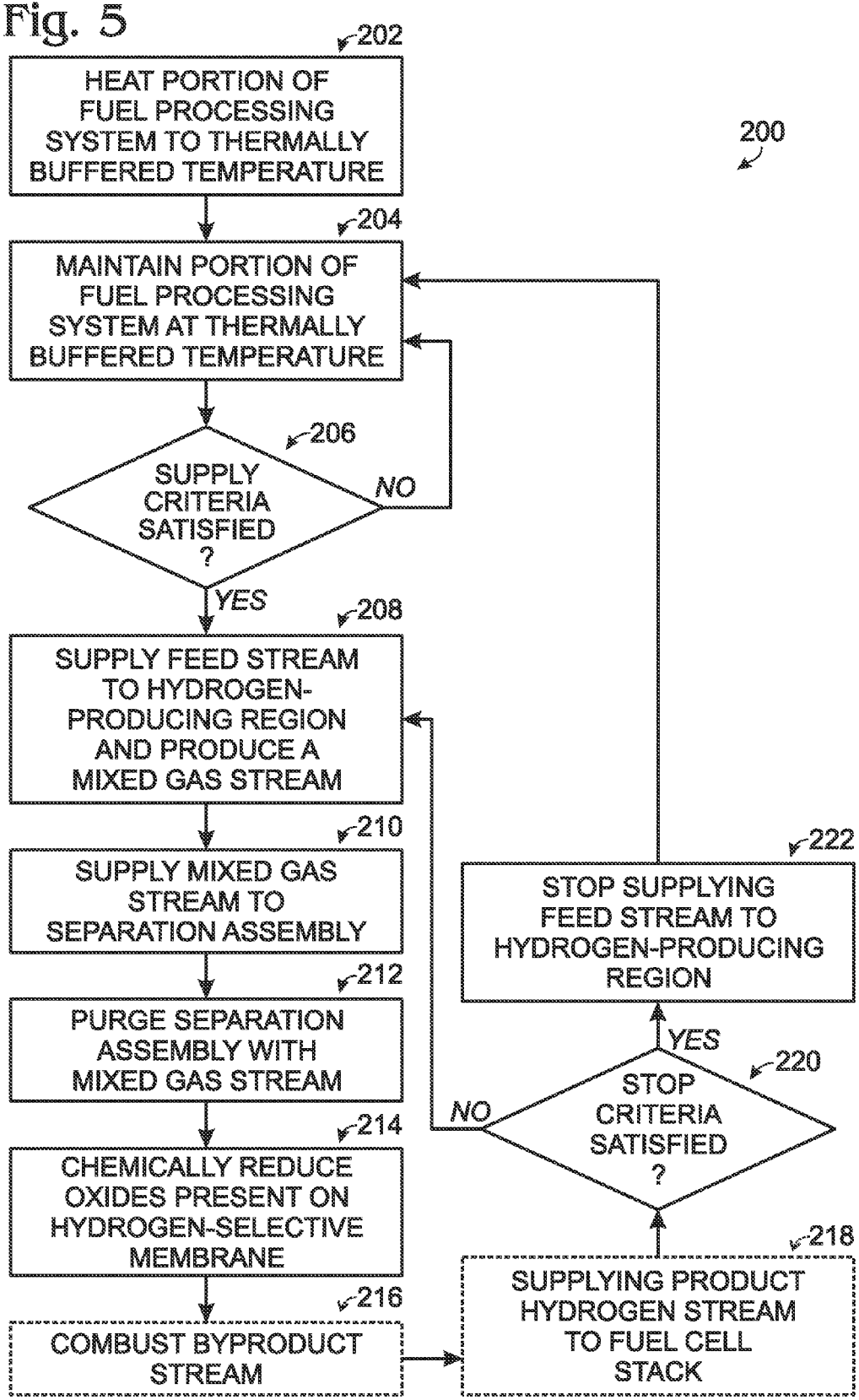

SYSTEMS AND METHODS FOR MAINTAINING HYDROGEN-SELECTIVE MEMBRANES DURING PERIODS OF INACTIVITY

FIELD OF THE DISCLOSURE

The following disclosure is directed to systems and methods for reducing and/or recovering performance loss that may be aggravated by idle time in hydrogen-producing fuel processing systems that are only intermittently operated to produce hydrogen gas, and more particularly to systems and methods for reducing and/or recovering decreases in hydrogen-selective membrane permeability due to idle time in thermally buffered hydrogen-producing and/or fuel cell systems.

BACKGROUND OF THE DISCLOSURE

Hydrogen-producing fuel processing systems include a plurality of system components, and each may be operated in a distinct chemical and/or physical environment. This may include differences in the temperature of the components, differences in the pressure of the gas streams contained within the components, and/or differences in the chemical composition of the materials contained therein, the streams that are supplied thereto, and/or the streams that are removed from the components. The chemical and/or physical environment of the components also may vary as a function of the operational state or status of the fuel cell system.

When operated continuously and/or under steady-state conditions, the chemical and/or physical environment within the various components of the hydrogen-producing fuel processing system may tend to be relatively constant. However, when operated intermittently, such as when the hydrogen-producing fuel processing system forms a portion of a fuel cell system that may be utilized as an auxiliary or backup power system, the transitions between the various operational states and/or the associated changes in the environment of the system components may lead to a decrease in system performance. This decrease in performance may become more significant as the length of the period of inactivity increases.

As an illustrative, non-exclusive example, hydrogen-producing fuel processing systems for use in fuel cell applications, as well as other applications that require a high-purity hydrogen gas stream, may include a separation assembly designed to separate the mixed gas (i.e., reformate) stream produced by a hydrogen generation assembly into a product hydrogen stream and a byproduct stream. The product hydrogen stream includes hydrogen gas at a required purity for use in the fuel cell stack, and the byproduct stream includes other gasses and/or contaminants that were present in the reformate stream. The separation assembly may utilize a variety of technologies, with hydrogen-selective, or hydrogen-permeable, membranes being an example of a useful technology for purifying hydrogen gas.

Hydrogen-selective membranes, such as which may be formed from palladium or a palladium alloy, are permeable to hydrogen gas but not to other gasses. Such hydrogen-selective membranes may be effective at removing impurities, such as carbon monoxide and other gasses, from the reformate stream during operation of the hydrogen-producing system. However, these membranes may not be as effective when the hydrogen-producing system is only operated intermittently to produce hydrogen gas, especially if the hydrogen-selective membrane is maintained at elevated temperatures and allowed to come into contact with oxides and/or contaminants during the periods of inactivity. In particular, intermittently used hydrogen-selective membranes may exhibit reduced permeability for hydrogen gas, resulting in low flow rates of the product hydrogen stream and a corresponding increase in the flow rate of the byproduct stream in the corresponding hydrogen-producing system. Thus, there exists a need for systems and methods for maintaining the hydrogen permeability of hydrogen-selective membranes during periods of inactivity in which the membranes are maintained at conditions where oxidation of the membranes may occur and/or in which the membranes may be exposed to contaminants.

SUMMARY OF THE DISCLOSURE

The present disclosure is directed to systems and methods for inhibiting, reducing, and/or recovering performance loss (i.e., decreased hydrogen permeability) that may be aggravated by idle time in thermally buffered hydrogen-producing fuel processing systems and/or hydrogen-producing fuel cell systems that are only intermittently operated to produce hydrogen gas. The systems and methods may additionally or alternatively be described as systems and methods for maintaining the hydrogen permeability of thermally buffered hydrogen-selective membranes during periods of inactivity. As discussed in more detail herein, these systems and methods may include periodic operation of at least a portion of the fuel cell system, periodically flowing process or other liquid and/or gas streams through at least a portion of the fuel processing system, providing a blanket gas to at least a portion of the fuel processing system, and/or pressurizing at least a portion of the fuel processing system. These systems and methods may decrease the potential for oxides and/or contaminants to diffuse into at least a portion of the fuel processing system and/or purge contaminants from the portion of the fuel processing system. The systems and methods may further include the use of an inactive operating state, in which at least the portion of the hydrogen-producing fuel processing system is maintained in a thermally buffered state. The portion of the fuel processing system may include at least the separation region or other portion of the fuel processing system that contains one or more hydrogen-selective membranes.

BRIEF DESCRIPTION OF THE DRAWINGS

FIG. 5 is a flow chart showing yet another illustrative, non-exclusive example of methods of removing hydrogen-selective membrane oxidation according to the present disclosure.

DETAILED DESCRIPTION AND BEST MODE OF THE DISCLOSURE

Figure 1:
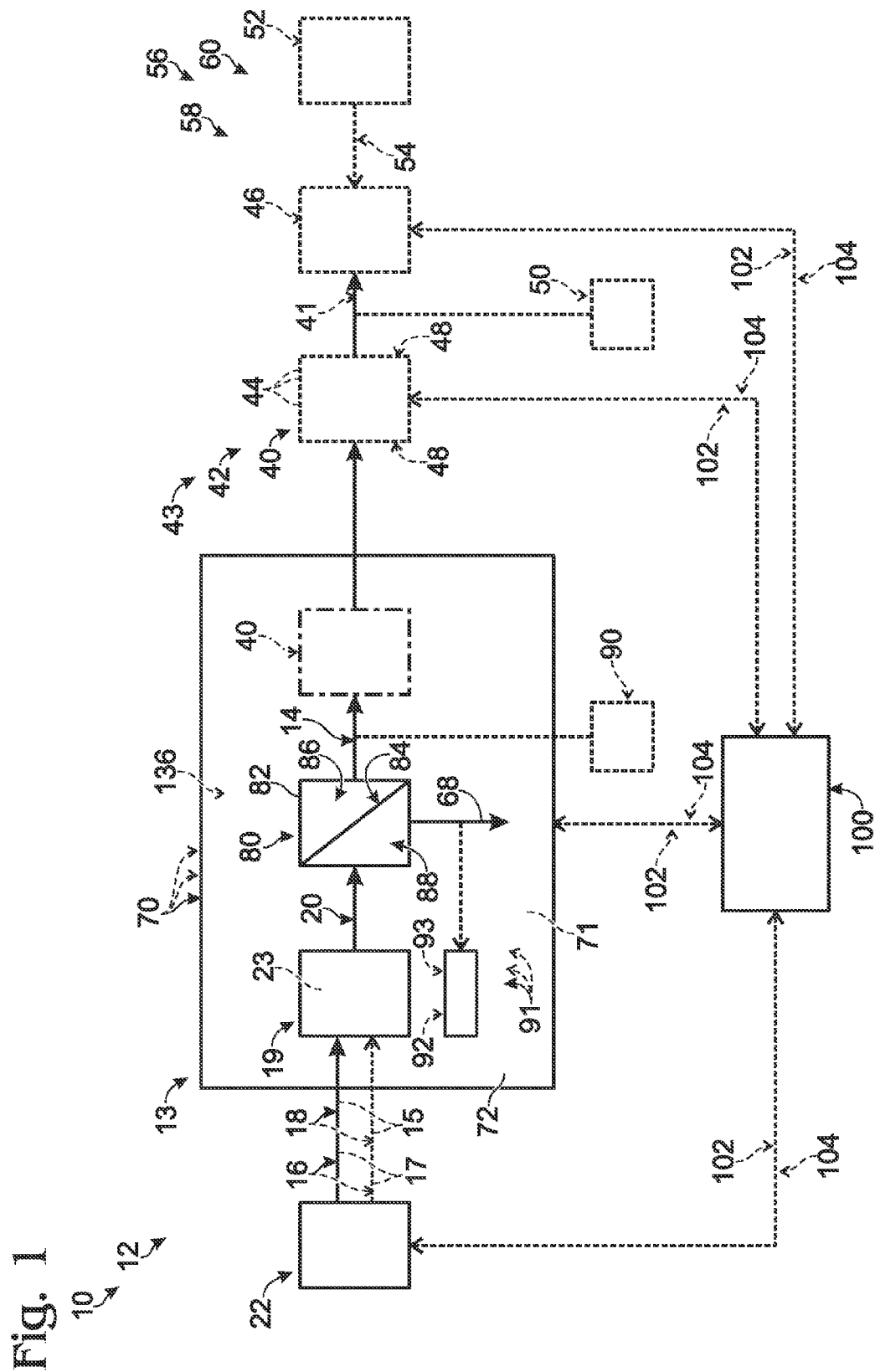
FIG. 1 is a schematic representation of an illustrative, non-exclusive example of a thermally buffered hydrogen-producing fuel processing system that may form a portion of a thermally buffered fuel cell system and/or a portion of a thermally buffered energy-producing and consuming assembly according to the present disclosure.

An illustrative, non-exclusive example of a thermally buffered hydrogen-producing fuel processing system 12 according to the present disclosure that includes a feedstock delivery system 22 and a thermally buffered fuel processing assembly 13 is shown in FIG. 1. Thermally buffered hydrogen-producing fuel processing system 12 also may be referred to as fuel processing system 12 and optionally may form a portion of a hydrogen-producing and consuming assembly 10 that may include a fuel cell system 42 and optionally may be in communication with an energy-consuming device 46.

By "thermally buffered," it is meant that the hydrogen-producing fuel processing system, (such as a hydrogen-producing region, separation assembly, and/or fuel cell stack thereof) is heated to a temperature that is above an ambient temperature proximate (i.e., an exterior environmental temperature near) the corresponding portion of the fuel processing system during periods in which the corresponding portion of the fuel processing system is in an inactive operating state or otherwise not being actively utilized for its intended (i.e., hydrogen-producing, hydrogen-purifying, and/or hydrogen-processing) purpose. This thermally buffered temperature or temperature range may include temperatures at which the corresponding portion of the system is heated to a temperature where it may efficiently perform its intended function (a "thermally primed" temperature) and/or temperatures at which the corresponding portion of the system is heated but not to a temperature where it may perform its intended function efficiently (a "thermally warmed" temperature), such as to a temperature where it may not perform the function at all or to a temperature where it may only perform this function at a reduced capacity or efficiency compared to when it is heated to a thermally primed temperature.

Feedstock delivery system 22 may provide one or more feed streams 16 that may include a carbon-containing feedstock 18, water 17, and/or oxygen gas 15 to a hydrogen-producing region 19 that may produce a mixed gas stream 20 therefrom. The mixed gas stream may be supplied to a separation assembly 80, which may separate the mixed gas stream into a product hydrogen stream 14 and a byproduct stream 68. The byproduct stream optionally may be supplied to a heating assembly 91 that may include a burner assembly 92 that may include one or more burners. The one or more burners, burner assembly, and/or heating assembly may be configured to heat a portion of hydrogen-producing fuel processing system 12, such as to an operating temperature, or temperature range, and/or to a thermally buffered (primed or warmed) temperature or temperature range. Product hydrogen stream 14 may be utilized for any suitable purpose. This optionally may include storing the product hydrogen stream for later use, such as in hydrogen storage device 90, and/or supplying the product hydrogen stream to a hydrogen-consuming assembly 43, such as to fuel cell system 42. Hydrogen storage device 90 may include any suitable structure adapted to store or otherwise contain a portion of product hydrogen stream 14. Illustrative, non-exclusive examples of hydrogen storage devices 90 include any suitable tank, pressure tank, and/or hydride storage bed.

When hydrogen-consuming assembly 43 includes fuel cell system 42, the electrical power output 41 from the fuel cell system may be stored for later use, such as through the use of an energy storage device 50, and/or utilized to satisfy an electrical load applied by energy-consuming device 46. Energy storage device 50 may include any suitable structure adapted to store at least a portion of the electrical output from the fuel cell stack. Illustrative, non-exclusive examples of energy storage devices 50 according to the present disclosure include any suitable battery, capacitor, ultracapacitor, supercapacitor, and/or flywheel. Thermally buffered hydrogen-producing fuel processing system 12 and/or hydrogen-producing and consuming assembly 10 may further include a controller 100 that may receive signals indicative of the status of the various system components and/or control the operation of the components.

It is within the scope of the present disclosure, but not required, that energy-consuming device 46 optionally may be in electrical communication with a primary power source 52. When energy-consuming device 46 is in electrical communication with a primary power source, hydrogen-producing and consuming assembly 10 may operate as an auxiliary and/or backup power system 56 adapted to satisfy the load applied by energy-consuming device 46 when primary power source 52 is unable to satisfy at least a portion of the applied load. Primary power source 52 includes any suitable structure adapted to supply a primary power source electrical output 54 to satisfy an applied load from energy-consuming device 46. Illustrative, non-exclusive examples of primary power sources include an electrical utility grid, a hydroelectric power source, a solar power source, a wind-powered power source, another fuel cell system, and/or an energy storage device or system. Some primary power sources may include an energy storage device, or system, in combination with another source of electrical power, such as a hydroelectric power source, a solar power source, and/or a wind-powered power source.

An illustrative, non-exclusive example of the primary power source being unable to satisfy at least a portion of the applied load includes the primary power source being unable to satisfy the entire applied load, such as when the magnitude of the applied load is greater than the magnitude of the electrical output available from the primary power source. Under these conditions, hydrogen-producing and consuming assembly 10 may supplement the electrical output from the primary power source and also may be referred to as a supplemental power source 60. Another illustrative, non-exclusive example of the primary power source being unable to satisfy at least a portion of the applied load includes the primary power source being unable to satisfy any of the applied load, such as when there is no or only minimal electrical output from the primary power source. Under these conditions, hydrogen-producing and consuming assembly 10 may provide backup power for energy-consuming device 46 and also may be referred to as a backup power source 58. Yet another illustrative, non-exclusive example of the primary power source being unable to satisfy at least a portion of the applied load includes the stability of the electrical output from the primary power source being below a threshold stability level. Under these conditions, hydrogen-producing and consuming assembly 10 may provide some or all of the power to energy-consuming device 46 and may be referred to as supplemental power source 60 and/or backup power source 58.

As an illustrative, non-exclusive example, hydrogen-producing fuel processing systems and/or hydrogen-producing and consuming assemblies according to the present disclosure may include (i.e., be configured to be operated at, or in) a plurality of operational states. Illustrative, non-exclusive examples of such operational (or operating) states include an "off" state, in which the fuel processing system is not heated and is not receiving a feed stream or producing a mixed gas stream, a "running" state, in which the fuel processing system is heated to an elevated temperature and is both receiving the feedstock stream and producing the mixed gas stream, and an "inactive" state, in which the fuel processing system is maintained at an elevated, thermally buffered, temperature but is not receiving the feedstock stream and/or producing the mixed gas stream. A further illustrative, non-exclusive example of an operational state that may (but is not required to be) utilized is a "faulted" state, in which the fuel processing system has detected and/or experienced a fault condition and is transitioning to the off or inactive states and/or awaiting a user input. As discussed in more detail herein, it is within the scope of the present disclosure that the temperature of at least a portion of the fuel processing system may be maintained at an elevated temperature in both the running and the inactive states, while the chemical composition of the material contained within the portion of the fuel processing system may differ between the two states. In contrast, both the temperature of the portion of the fuel processing system and the chemical composition of the material contained therein may differ between the running and off states.

Thermally buffered fuel processing assembly 13 includes a heated containment structure 70 that defines an internal compartment 72, which contains at least separation assembly 80 and which may further include other components 136. Illustrative, non-exclusive examples of other components 136 that may be included, but which are not required to be included, within internal compartment 72 include hydrogen-producing region 19, fuel cell stack 40, heating assembly 91, and/or a portion of feedstock delivery system 22, as well as any suitable valves, conduits, and/or piping associated with the above components. It is also within the scope of the present disclosure that internal compartment 72 may include additional system components. It is further within the scope of the present disclosure that the components contained within internal compartment 72 may be maintained at substantially the same temperature; however, it is also within the scope of the present disclosure that the components contained within the internal compartment may be maintained at different temperatures. This may be accomplished in any suitable manner, such as through the use of separate heating assemblies 91 for the various components contained within the internal compartment, the distance of a particular component from a heating assembly, internal structure such as baffles, supports, partitions, and/or the like to direct and/or control heat flow from the heating assembly, and/or the use of a plurality of heated containment structures, each with internal compartments that are maintained at separate temperatures and/or ranges of temperatures. It is also within the scope of the present disclosure that heated containment structure 70 may include insulation 71 that may decrease the rate of heat transfer between internal compartment 72 and the environment and/or control the flow of heat among the components contained within the internal compartment.

In thermally buffered fuel processing system 12, heating assembly 91 is adapted to heat and maintain the internal compartment, and structures contained therein, at a threshold temperature, or within a threshold temperature range. It is within the scope of the present disclosure that this threshold temperature, or temperature range, may correspond to a suitable steady-state operating temperature for at least one of the structures contained within the internal compartment and may be referred to as a thermally primed temperature or thermally primed temperature range. When the internal compartment is maintained within a thermally primed temperature range, the component(s) contained within the internal compartment may be operated at their steady-state operating temperature or temperature range without the need for additional heating to reach the steady-state operating temperature or temperature range. Illustrative, non-exclusive examples of thermally primed fuel processing and fuel cell systems are described in U.S. Pat. No. 7,659,019 and U.S. Patent Application Publication No. 2010/0136453, the complete disclosures of which are hereby incorporated by reference.

It is within the scope of the present disclosure that this threshold temperature or temperature range corresponds to a temperature that is greater than a temperature of the ambient environment surrounding the thermally buffered hydrogen-producing fuel processing system but less than a suitable steady-state operating temperature or temperature range for at least one of the structures contained within the internal compartment and may be referred to as a thermally warmed temperature or thermally warmed temperature range. When the internal compartment is maintained within a thermally warmed temperature range, it is within the scope of the present disclosure that the component(s) contained within the internal compartment may be capable of operating at this thermally warmed temperature without the need for additional heating but that operation at this reduced temperature may include operating at a reduced capacity. However, it is also within the scope of the present disclosure that the component(s) contained within the internal compartment may be heated and/or may require heating from the thermally warmed temperature range to a steady-state temperature range prior to their intended, or fully functional, operation.

Feed stream(s) 16 may be delivered to hydrogen-producing region 19 of thermally buffered hydrogen-producing fuel processing system 12 via any suitable mechanism. While a single feed stream 16 is shown in solid lines in FIG. 1, it is within the scope of the disclosure that more than one feed stream 16 may be used and that these streams may contain the same or different feedstocks. This is schematically illustrated by the inclusion of a second feed stream 16 in dashed lines in FIG. 1. When feed stream 16 contains two or more components, such as carbon-containing feedstock 18 and water 17, the components may be delivered in the same or different feed streams. For example, when the fuel processor is adapted to produce hydrogen gas from a carbon-containing feedstock and water, and optionally (at least until both streams are vaporized or otherwise gaseous), when they are not miscible with each other, these components are typically delivered in separate streams, such as shown in FIG. 1 by reference numerals 17 and 18 pointing to different feed streams. When the carbon-containing feedstock is miscible with water, the feedstock may be delivered with the water component of feed stream 16, such as shown in FIG. 1 by reference numerals 17 and 18 pointing to the same feed stream 16. For example, when the fuel processor receives a feed stream containing water and a water-soluble alcohol, such as methanol, these components may be premixed and delivered as a single stream.

In FIG. 1, feed stream 16 is shown being delivered to fuel processor 12 by feedstock delivery system 22, which schematically represents any suitable mechanism, device, or combination thereof for selectively delivering the feed stream to the fuel processor. For example, the delivery system may include one or more pumps that are adapted to deliver the components of stream 16 from one or more supplies. Additionally or alternatively, feedstock delivery system 22 may include a valve assembly adapted to regulate the flow of the components from a pressurized supply. This supply may be located external of the fuel processing assembly, or they may be contained within or adjacent the assembly. When feed stream 16 is delivered to the fuel processor in more than one stream, the streams may be delivered by the same or separate feedstock delivery systems. Illustrative, non-exclusive examples of feedstock delivery systems are disclosed in U.S. Pat. Nos. 7,601,302, 6,375,906, 7,135,048, and 6,890,672, and in U.S. Patent Application Publication No. 2009/0155642, the complete disclosures of which are hereby incorporated by reference.

Hydrogen-producing region 19 may utilize any suitable process or mechanism to produce hydrogen gas from feed stream(s) 16 and may be contained within or external to internal compartment 72. Mixed gas stream 20 output from the hydrogen-producing region contains hydrogen gas as a majority component. Mixed gas stream 20 may include one or more additional gaseous components, which also may be referred to as contaminants or impurities, and thereby may be referred to as a mixed gas stream that contains hydrogen gas as its majority component and which also contains other gases as minority components. As discussed herein, illustrative, non-exclusive examples of suitable mechanisms for producing hydrogen gas from feed stream(s) 16 include steam reforming, autothermal reforming, and partial oxidation reforming, in which reforming catalysts are used to produce hydrogen gas from a feed stream 16 containing a carbon-containing feedstock 18 and water 17. Examples of suitable carbon-containing feedstocks 18 include at least one hydrocarbon or alcohol. Examples of suitable hydrocarbons include methane, propane, natural gas, diesel, kerosene, gasoline, and the like. Examples of suitable alcohols include methanol, ethanol, and polyols, such as ethylene glycol and propylene glycol. Other suitable mechanisms for producing hydrogen gas from feed stream(s) 16 include ammonia decomposition, electrolysis of water, and water-gas-shift reactions. Illustrative, nonexclusive examples of suitable hydrogen-producing regions and/or mechanisms are disclosed in U.S. Pat. Nos. 6,221,117, 5,997,594, 5,861,137, and in U.S. Patent Application Publication Nos. 2001/0045061, 2003/0192251, and 2003/0223926, the complete disclosures of which are hereby incorporated by reference.

Steam reforming is one illustrative, non-exclusive example of a hydrogen-producing mechanism that may be employed in hydrogen-producing region 19, in which feed stream 16 comprises water and a carbon-containing feedstock. In a steam reforming process, hydrogen-producing region 19 contains a suitable steam reforming catalyst 23, as indicated in dashed lines in FIG. 1. In such an embodiment, the fuel processor may be referred to as a steam reformer, hydrogen-producing region 19 may be referred to as a reforming region, and output, or mixed gas, stream 20 may be referred to as a reformate stream. As used herein, reforming region 19 refers to any hydrogen-producing region utilizing any of the hydrogen-producing mechanisms discussed herein. The other gases that may be present in the reformate stream may include carbon monoxide, carbon dioxide, methane, steam, and/or unreacted carbon-containing feedstock.

Steam reformers typically operate at temperatures in the range of 200° C. and 900° C., and at pressures in the range of 50 psi and 300 psi, although temperatures and pressures outside of this range are within the scope of the disclosure. When the carbon-containing feedstock is methanol, the hydrogen-producing steam reforming reaction will typically operate in a temperature range of approximately 200-500° C. Illustrative subsets of this range include 350-450° C., 375-425° C., and 375-400° C. When the carbon-containing feedstock is a hydrocarbon, ethanol, or a similar alcohol, a temperature range of approximately 400-900° C. will typically be used for the steam reforming reaction. Illustrative subsets of this range include 750-850° C., 725-825° C., 650-750° C., 700-800° C., 700-900° C., 500-800° C., 400-600° C., and 600-800° C. It is within the scope of the present disclosure for the hydrogen-producing region to include two or more zones, or portions, each of which may be operated at the same or at different temperatures. For example, when the hydrogen-production fluid includes a hydrocarbon, in some embodiments it may be desirable to include two different hydrogen-producing portions, with one operating at a lower temperature than the other to provide a pre-reforming region. In such an embodiment, the fuel processing system may alternatively be described as including two or more hydrogen-producing regions.

When the internal compartment includes hydrogen-producing region 19, illustrative, non-exclusive examples of the thermally buffered temperature or temperature range may include temperatures between 100° C. and 900° C., including temperatures of 150° C., 175° C., 200° C., 225° C., 250° C., 275° C., 300° C., 325° C., 350° C., 375° C., 400° C., 425° C., 450° C., 500° C., 550° C., 600° C., 700° C., and 800° C., as well as temperatures in the range of 200-800° C., 200-500° C., 250-450° C., 275-450° C., 300-400° C., 350-450° C., 400-850° C., 500-800° C., and 600-700° C., though temperatures outside of these ranges are also within the scope of the present disclosure. It should be understood that suitable thermally buffered (including thermally primed and thermally warmed) temperatures and temperature ranges for a hydrogen-producing region may vary depending upon a variety of factors, illustrative, non-exclusive examples of which may include the particular configuration of the hydrogen-producing region, the feedstock(s) being reacted therein, the catalyst and/or hydrogen-producing mechanism (reaction) being utilized to produce hydrogen gas from the feedstock(s), etc. Illustrative, non-exclusive examples of thermally primed temperatures for the hydrogen-producing region include temperatures between 250° C. and 400° C. when the carbon-containing feedstock includes an alcohol, as well as temperatures between 600° C. and 900° C. when the carbon-containing feedstock includes a hydrocarbon, including the illustrative temperatures and temperature ranges described above. Illustrative, non-exclusive examples of thermally warmed temperatures for the hydrogen-producing region include temperatures that are greater than the ambient temperature proximate the hydrogen-producing region yet less than a minimum thermally primed hydrogen-producing temperature. More specific illustrative, non-exclusive examples include temperatures between 100° C. and 250° C. when the carbon-containing feedstock includes an alcohol, as well as temperatures between 100° C. (and optionally 250° C. or 400° C.) and 600° C. when the carbon-containing feedstock includes a hydrocarbon.

As discussed in more detail herein, at least a portion of separation assembly 80 is contained within internal compartment 72 of heated containment structure 70 and separates mixed gas stream 20 into product hydrogen stream 14 and byproduct stream 68. Product hydrogen stream 14 includes hydrogen gas and may include at least one of an increased concentration of hydrogen gas and a decreased concentration of at least one impurity (other gas) when compared to the mixed gas stream. Illustrative, non-exclusive examples of separation assemblies according to the present disclosure include membrane separation assemblies 82, which utilize at least one hydrogen-permeable membrane to separate the mixed gas stream into the product hydrogen stream and the byproduct stream. Illustrative, non-exclusive examples of separation assemblies that utilize at least one hydrogen-selective membrane, including components thereof and methods of operating the same are described in U.S. Pat. Nos. 5,997,594, 6,152,995, 6,221,117, 6,319,306, 6,419,728, 6,494,937, 6,537,352, 6,547,858, 6,562,111, 6,569,227, and 6,723,156, and in U.S. Patent Application Publication Nos. 2007/0266631 and 2008/0138678.

Separation assembly 80 contained within internal compartment 72 includes at least one membrane separation assembly 82. Membrane separation assembly 82 includes at least one hydrogen-selective membrane 84, and optionally may include a plurality of hydrogen-selective membranes 84, that divide(s) the separation assembly into a retentate side, or retentate region, 88 and a permeate side, or permeate region, 86. Mixed gas stream 20 is received within retentate side 88 and hydrogen gas contained within the mixed gas stream diffuses through the hydrogen-selective membrane to permeate side 86, where it is removed from the membrane separation assembly as product hydrogen stream 14. When the separation assembly receives mixed gas stream 20 produced by a steam reformer or other hydrogen-producing region that utilizes a reforming reaction to produce the mixed gas stream, the retentate side may be referred to as the reformate side (or reformate region).

The portion of the mixed gas stream that does not diffuse through the hydrogen-selective membrane(s) may include the impurities contained within mixed gas stream 20, as well as a portion of the hydrogen gas contained therein, and may be discharged from the membrane separation assembly as byproduct stream 68. Relative to mixed gas stream 20, byproduct stream 68 thus contains a greater concentration of impurities (other gases) and/or a lower concentration of hydrogen gas. Byproduct stream 68 may be disposed of in any suitable manner, including being discharged to the environment external the thermally buffered hydrogen-producing fuel processing system, chemically treated and/or reacted prior to being discharged, supplied as a fuel stream to burner assembly 92, utilized as a reactant stream for another chemical process, and/or stored for later use.

Hydrogen-selective membrane 84 is formed from any suitable material that enables diffusion of hydrogen gas therethrough, while restricting the diffusion of the other materials contained within the mixed gas stream. Illustrative, non-exclusive examples of hydrogen-selective membranes 84 according to the present disclosure include membranes constructed of one or more of palladium, palladium alloys, palladium alloys containing copper, palladium alloys containing silver, and palladium alloys containing gold, as well as other metallic membranes constructed of substantially pure or alloyed metals. Illustrative, non-exclusive examples of suitable hydrogen-selective membrane compositions containing an alloy of palladium and copper include alloys with 15-45 wt % copper, including alloys with 15-25 wt % copper, 35-45 wt % copper, 20 wt % (or approximately 20 wt %) copper, or 40 wt % (or approximately 40 wt %) copper. Illustrative, non-exclusive examples of suitable hydrogen-selective membranes, membrane compositions, and separation assemblies containing the same are disclosed in U.S. Pat. No. 6,537,352 and in U.S. Patent Application Publication No. 2008/0210088, the complete disclosures of which are hereby incorporated by reference.

When the internal compartment includes a membrane separation assembly 82 that utilizes at least one hydrogen-selective membrane formed from palladium, a palladium alloy, or another oxidizable hydrogen-selective material, illustrative, non-exclusive examples of the thermally buffered temperature or temperature range includes temperatures that are at least 100° C., including temperatures of greater than 175° C., 200° C., 250° C., 275° C., 300° C., 350° C., 400° C., and 450° C., as well as temperatures in the range of 100-500° C., including temperatures in the range of 100-450° C., 150-425° C., 200-400° C., 225-350° C., 275-450° C., 100-275° C., 140-240° C., 350-450° C., and 300-500° C., though temperatures outside of these ranges are also within the scope of the present disclosure. Particular thermally primed and thermally warmed temperatures for a particular separation assembly may vary according to a variety of factors, illustrative, non-exclusive examples of which include the construction of the separation assembly, the composition of the hydrogen-selective membrane(s) utilized therein, the composition of the enclosure and/or other components of the separation assembly, etc.

As a particular, yet non-exclusive example, for a separation assembly that utilizes hydrogen-selective membranes containing an alloy of palladium and approximately 35-45 wt % copper, suitable thermally primed temperatures include temperatures in the range of 300-450° C., and thermally warmed temperatures include temperatures that are greater than the ambient temperature proximate the separation assembly and less than 300° C. (i.e., in a temperature range of 25° C. and 300° C. For such membranes, at a thermally warmed temperature of less than 200° C., the membranes may not provide separation of the mixed gas stream into the product and byproduct streams even though the membranes are heated to a thermally buffered temperature. As a further illustrative, non-exclusive example, at a temperature of 250° C., the membranes may have a hydrogen permeability that is approximately 60% of the corresponding hydrogen permeability at a temperature of 400° C.

For a given separation assembly 80 containing a membrane separation assembly 82 with one or more hydrogen-selective membranes 84, the thermally buffered temperature to be utilized may be selected based on one or more of a variety of factors. Illustrative, non-exclusive examples of such factors include the composition of the membrane, the surface area of the membrane, the desired flow rate of hydrogen gas to be produced by the membrane separation assembly, the composition and/or flow rate of the mixed gas stream to be delivered to the membrane separation assembly, the need for the membrane separation assembly to be maintained at its thermally primed state (and/or at its preferred hydrogen permeability), the acceptability (if any) for the membrane separation assembly to be at a decreased hydrogen permeability while in the inactive state, design preferences, the permissible (if any) time and/or degree to which the hydrogen-selective membrane may be heated after there is a demand for the separation assembly to purify a mixed gas stream produced by the hydrogen-producing region, etc.

Heating assembly 91 may utilize any suitable structure to supply heat to internal compartment 72 of heated containment structure 70 and/or to the components contained therein. This may include a burner assembly 92 and/or an electrical heating assembly 93. When heating assembly 91 includes burner assembly 92, the fuel for burner assembly 92 may be provided by any suitable source. Illustrative, non-exclusive examples of fuels for burner assembly 92 include byproduct stream 68, as discussed in more detail herein, product hydrogen stream 14, mixed gas stream 20, feed stream 16, carbon-containing feedstock 18, or any other suitable combustible fuel source. Illustrative, non-exclusive examples of sources of electrical energy for electrical heating assembly 93 include energy supplied by energy storage device 50, fuel cell stack 40, and/or primary power source 52.

The product hydrogen stream 14 produced by the fuel processing assembly may be delivered to a fuel cell stack 40 of fuel cell system 42. A fuel cell stack is a device that produces an electrical potential from a source of protons, such as hydrogen gas, and an oxidant, such as oxygen gas. Accordingly, a fuel cell stack may be adapted to receive at least a portion of product hydrogen stream 14 and a stream of (or containing) oxygen gas (which is typically delivered as an air stream), and to produce an electric current therefrom. This is schematically illustrated in FIG. 1, in which a fuel cell stack is indicated at 40 and produces an electric current, or power output, which is schematically illustrated at 41. Fuel cell stack 40 contains at least one, and typically multiple, fuel cells 44 that are adapted to produce an electric current from the oxidant and the portion of the product hydrogen stream 14 delivered thereto. The fuel cells typically are joined together between common end plates 48, which contain fluid delivery/removal conduits, although this construction is not required to all embodiments. Illustrative, non-exclusive examples of suitable fuel cells include proton exchange membrane (PEM) fuel cells, high temperature proton exchange membrane fuel cells, low temperature proton exchange membrane fuel cells, polybenzimidazole (BPI) membrane fuel cells, alkaline fuel cells, and phosphoric acid fuel cells, though other types of fuel cells are also within the scope of the present disclosure.

As discussed in more detail herein, fuel cell stack 40 may include a thermally buffered fuel cell stack that optionally may be contained within heated containment structure 70 and be heated to a fuel cell stack thermally buffered temperature or temperature range. When the fuel cell stack includes a polymer electrolyte membrane fuel cell stack that is contained within heated containment structure 70, illustrative, non-exclusive examples of the fuel cell stack thermally buffered temperature or temperature range may include temperatures between 40° C. and 100° C., including temperatures of (or at least) 40° C., 45° C., 50° C., 55° C., 60° C., 65° C., 70° C., 75° C., 80° C., 85° C., 90° C., and 95° C., as well as temperatures in the range of 40-80° C., 50-60° C., 60-80° C., 60-95° C., 70-90° C., and 75-85° C., though temperatures outside of these ranges are also within the scope of the present disclosure. Illustrative, non-exclusive examples of thermally warmed temperatures for the fuel cell stack include temperatures between 40° C. and 60° C. Illustrative, non-exclusive examples of thermally primed temperatures for the fuel cell stack include temperatures between 65° C. and 95° C.

As discussed in more detail herein, the electric current, or power output, 41 produced by stack 40 may be used to satisfy the energy demands, or applied load, of at least one associated energy-consuming device 46. Illustrative, non-exclusive examples of energy-consuming devices 46 include, but should not be limited to, tools, lights or lighting assemblies, appliances (such as household or other appliances), households or other dwellings, offices or other commercial establishments, computers, signaling or communication equipment, etc. Similarly, fuel cell stack 40 may be used to satisfy the power requirements of fuel cell system 42, which may be referred to as the balance-of-plant power requirements of the fuel cell system. Energy-consuming device 46 is schematically illustrated in FIG. 1 and is meant to represent one or more devices, or collection of devices, that are adapted to draw electric current from, or apply an electrical load to, the fuel cell system.

As shown in FIG. 1 and discussed herein, thermally buffered hydrogen-producing fuel processing systems 12 according to the present disclosure may include a controller 100 that is adapted or configured to control the operation of at least a portion of the thermally buffered hydrogen-producing fuel processing system. As an illustrative, non-exclusive example, and as shown in dashed lines in FIG. 1, controller 100 may be configured to receive status signals 102 that are indicative of the status of the various components of the thermally buffered hydrogen-producing fuel processing system and may generate control signals 104 to control the operation of the various components of the thermally buffered hydrogen-producing fuel processing system based at least in part on the value of the status signals and/or calculations internal to the controller. This control may be implemented manually by the user, through the use of an electronic controller, or through a combination of the two. The controller may include any suitable type and number of devices or mechanisms to implement and provide for the desired monitoring and/or control of the thermally buffered hydrogen-producing fuel processing system.

As illustrative, non-exclusive examples, a suitable controller may take the form of analog or digital circuitry, together with appropriate electronic instructions that may be stored on magnetic media or programmable memory such as read only memory (ROM), programmable read only memory (PROM), or erasable programmable read only memory (EPROM), and may be integrated into one or more systems or assemblies of thermally buffered hydrogen-producing fuel processing system 12 or be a separate, stand-alone computing device. The controller may be adapted or otherwise programmed or designed to control the operation of the thermally buffered hydrogen-producing fuel processing system in the plurality of operating states of the system, including the various components thereof. Illustrative, non-exclusive examples of controllers 100 according to the present disclosure are described in U.S. Pat. Nos. 6,383,670, 6,495,277, 6,811,908, 6,835,481, 6,979,507, 7,208,241, and 7,390,587, as well as in U.S. Patent Application Publication Nos. 2005/0266284, 2005/0266285, 2006/0024540, 2006/0134473, and 2008/0176118, the complete disclosures of which are hereby incorporated by reference, As discussed in more detail herein, controller 100 may control the operation of at least a portion of thermally buffered hydrogen-producing fuel processing system 12 and/or hydrogen-producing and consuming assembly 10 based at least in part on the status of various components of the thermally buffered hydrogen-producing fuel processing system and/or calculations internal to the controller. Illustrative, non-exclusive examples of status signals 102 may, but are not required to, include controller 100 receiving status signals indicative of the operational state of the various components of thermally buffered hydrogen-producing fuel processing system 12, as well as the temperature of the components and/or the temperature, pressure, concentration, flow rate, and/or humidity of the streams contained therein. More specific, yet still illustrative, non-exclusive examples, include controller 100 receiving status signals 102 indicative of the hydrogen permeability of the hydrogen-selective membrane, the hydration level of the fuel cell stack, the electrical impedance of the fuel cell stack, the pressure within the separation assembly, and/or the temperature of the components within internal compartment 72, and/or the ability of primary power system 52 to satisfy the electrical load applied by energy-consuming device 46.

Illustrative, non-exclusive examples of portions of the thermally buffered hydrogen-producing fuel processing system that may be controlled by controller 100 include any suitable valve, pump, compressor, flow regulating device, temperature regulating device, electrical energy regulating device, pressure regulating device, and the like. More specific, yet still illustrative, non-exclusive, examples include controller 100 controlling the flow rate of feed stream 16, such as by controlling the operation of the various pumps, compressors, valves, and/or mass flow controllers included in feedstock delivery system 22; controller 100 controlling the temperature of internal compartment 72 and/or the various system components contained therein, such as by controlling the supply of electrical energy to electrical heating assembly 93 and/or the flow rate of combustible fuel and/or oxidant to burner assembly 92; controller 100 controlling the temperature of reforming region 19, separation assembly 80, and/or fuel cell stack 40; controller 100 controlling the consumption of power output 41 by energy-consuming device 46; controller 100 controlling the concentration of one or more materials contained within thermally buffered hydrogen-producing fuel processing system 12; controller 100 controlling the flow rate of the mixed gas, product hydrogen, and/or byproduct streams; controller 100 controlling the pressure within the separation assembly; and/or controller 100 controlling the operation and/or operational state of the various components that comprise thermally buffered hydrogen-producing fuel processing system 12, such as feedstock delivery system 22, hydrogen-producing region 19, separation assembly 80, fuel cell stack 40, and/or thermally buffered fuel processing assembly 13.

Figure 2:
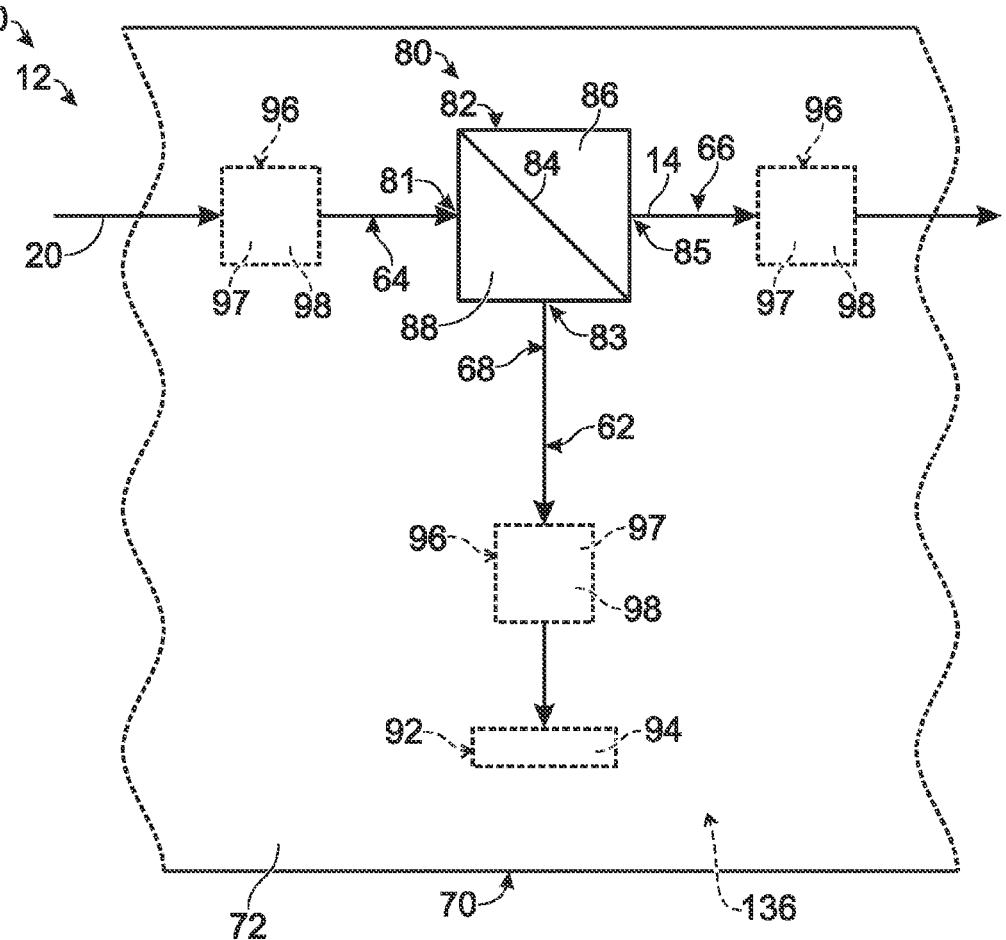
FIG. 2 is a schematic representation of an illustrative, non-exclusive example of a thermally buffered membrane separation assembly that may form a portion of the thermally buffered hydrogen-producing fuel processing system according to the present disclosure.

FIG. 2 provides an illustrative, non-exclusive example of thermally buffered separation assembly 80 that includes membrane separation assembly 82, which as discussed contains at least one hydrogen-selective membrane 84. As illustrated, the thermally buffered separation assembly forms a portion of thermally buffered hydrogen-producing fuel processing system 12. As discussed in more detail herein, during the running state, mixed gas stream 20 may be supplied to retentate side 88 of membrane separation assembly 82 and separated within the membrane separation assembly into product hydrogen stream 14 and byproduct stream 68. However, during the off, inactive, and/or faulted states, the mixed gas stream may not be supplied to the membrane separation assembly. Thus, the pressure within the separation assembly may be at, or may approach, ambient and/or atmospheric pressure, and atmospheric air may diffuse into or otherwise enter the separation assembly and contact the hydrogen-selective membrane(s) 84 therein. As illustrative, non-exclusive examples, air may enter the separation assembly through mixed gas stream inlet 81 by diffusing down mixed gas conduit 64, through product hydrogen stream outlet 85 by diffusing down product hydrogen stream conduit 66, and/or through byproduct stream outlet 83 by diffusing down byproduct stream conduit 62.

Atmospheric, or environmental, air contains oxygen gas, which may reduce the hydrogen permeability of the membrane(s) when permitted to contact the membrane(s) while the membrane(s) is/are maintained at a thermally buffered temperature, such as the temperatures discussed herein. For example, this decrease in hydrogen permeability may be caused by the oxygen gas oxidizing the hydrogen-selective membrane(s). In addition to oxygen gas, this air that contacts the membrane(s) also may contain other contaminants that also may decrease the hydrogen permeability of the membrane(s) when exposed thereto at a thermally buffered temperature. Illustrative, non-exclusive examples of such contaminants that may decrease the hydrogen permeability of a thermally buffered hydrogen-selective membrane include oxidants (in addition to oxygen gas), halogens, salts (such as sodium chloride), carbon monoxide, ammonia, hydrogen sulfide, sulfur oxides, and poisons.

As used herein, "permeability decreasing contaminants" and/or "permeability decreasing compositions" refer to oxygen gas, poisons, and other contaminants that decrease the hydrogen permeability of a thermally buffered hydrogen-selective membrane. These permeability decreasing contaminants/compositions will often be gasses (or gaseous), but they may take other forms, such as in the case of the illustrative, non-exclusive example of sodium chloride and other salts that may decrease the hydrogen permeability of thermally buffered hydrogen-selective membranes. This decrease in permeability may be reversible, or repairable, such as through reduction of the membrane (i.e., exposing the membrane to a reducing environment, or reducing gas) to remove the formed oxides and/or sorbed contaminants. For example, decrease in hydrogen permeability due to oxidation of the membranes and/or sorbed carbon monoxide or hydrogen sulfide may be reversed, or repaired by exposing the membranes to a reducing environment, such as disclosed herein. As used herein, the term "sorb" means binding and/or retaining the composition, contaminant, or other species gas by any process, including adsorption, absorption, chemical bonding, or a combination thereof, among others. Accordingly, the term "desorb," as used herein, means unbinding or freeing of bound (sorbed) species.

Some permeability decreasing contaminants/compositions may result in a decrease in the hydrogen permeability of the thermally buffered hydrogen-selective membranes that is not reversible or repairable. For example, some poisons may not be removed from the membranes by exposing the membranes to a reducing environment. Accordingly, preventing or otherwise inhibiting these permeability decreasing contaminants/compositions from contacting the hydrogen-selective membranes, such as via the systems and/or methods disclosed herein, may maintain the hydrogen permeability of the membranes during periods in which the hydrogen-producing fuel processing system and/or corresponding separation assembly thereof are in off, inactive, or other "non-running" operating states. In other words, by preventing or otherwise inhibiting contact between the membranes and the permeability decreasing contaminants/compositions, the hydrogen permeability of the membranes that otherwise may result therefrom may be avoided.

As discussed herein, maintaining the membranes in a non-oxidizing environment, such as by maintaining exposure of the membranes with a gas or gas stream that does not contain, or does not contain a sufficient concentration of, an oxidant or other permeability decreasing contaminant/composition, may prevent or inhibit a decrease in the hydrogen permeability of the membranes. Likewise, preventing contact or exposure between the thermally buffered hydrogen-selective membranes and one or more permeability decreasing contaminants/compositions also may prevent or otherwise inhibit a decrease in the hydrogen permeability of the membranes. While this is within the scope of the present disclosure, it is also within the scope of the present disclosure that some reversible decrease of the permeability may be permitted. For example, and as discussed herein, periodic, or intermittent, exposure of the membranes to a reducing gas may be utilized to increase the hydrogen permeability of thermally buffered hydrogen-selective membranes whose permeability has been decreased, such as due to exposure to oxygen gas or other permeability decreasing contaminants/compositions.

Accordingly, references herein to maintaining the hydrogen permeability of a thermally buffered hydrogen-selective membrane, such as membrane 84, may include reversing, or otherwise eliminating, repairing, or remedying existing decreases in hydrogen permeability and/or preventing decreases in the hydrogen permeability of the membrane. However, this term is not intended to require both of the above. For the purpose of brevity, the following discussion will largely discuss a decrease in hydrogen permeability due to oxidation of a hydrogen-selective membrane, such as by oxygen gas, but it is within the scope of the present disclosure that the following discussion may be applicable to other decreases in hydrogen permeability, including decreases caused by exposure to other permeability decreasing contaminants/compositions, such as those discussed herein. In other words, the following examples are intended for the purposes of illustration and not limitation, as other causes, repairs, maintenance processes, permeability decreasing contaminants/compositions, etc. are within the scope of the present disclosure.

As an illustrative, non-exclusive example, and as discussed in more detail herein, during the running state, byproduct stream 68 may flow from separation assembly 80 to burner assembly 92 and be combusted therein to supply heat to the thermally buffered hydrogen-producing fuel processing system. Under these conditions, the diffusion of oxygen gas and/or other permeability decreasing contaminants/compositions through the byproduct conduit may be minimal or even completely prevented due to the positive pressure of the byproduct stream with respect to atmospheric pressure. However, and as discussed in more detail herein, in the off, faulted, and/or inactive states, there may not be a flow of the byproduct stream through the byproduct conduit. Under these conditions, oxygen gas and/or other permeability decreasing contaminants/compositions may enter burner assembly 92 through a burner orifice 94 and diffuse up byproduct stream conduit 62 to separation assembly 80, coming into contact with hydrogen-selective membrane 84. Even when conventional flow control devices, such as check valves or solenoid valves, are utilized, some diffusion of oxygen gas and/or other permeability decreasing contaminants/compositions may occur.

The oxygen gas and/or other permeability decreasing contaminants/compositions that enter the separation assembly may react with hydrogen-selective membrane 84, decreasing the hydrogen permeability of the hydrogen-selective membrane. The extent of membrane oxidation, together with the magnitude of the decrease in the permeability of the hydrogen-selective membrane may vary with the temperature of the hydrogen-selective membrane, the temperature of the separation assembly, and/or the period of time over which the hydrogen-selective membrane is exposed to the oxygen gas and/or other permeability decreasing contaminants/compositions. As a further illustrative, non-exclusive example, hydrogen-selective membranes that include palladium or a palladium alloy may oxidize at temperatures above approximately 200° C. to form palladium oxide upon exposure to air. The rate and extent of oxidation increases with increasing temperature, and the membrane surface may be completely oxidized at temperatures between 400° C. and 500° C.

Subsequent exposure of these oxidized palladium membranes to a reducing gas or reducing environment, such as by exposure to hydrogen gas, may reduce the membrane, removing the surface oxides and restoring hydrogen permeability. However, the reduction of surface oxides may require a significant amount of time, increasing the time needed to transition the separation assembly from the off, inactive, and/or faulted states to the running state. In addition, after prolonged exposure to oxygen gas and/or other permeability decreasing contaminants/compositions at an elevated temperature, membrane permeability may be permanently altered. Since the rate of membrane oxidation may increase with increasing temperature and increased exposure time, the impact of oxidation on the hydrogen permeability of membrane separation assemblies may be increased for thermally buffered hydrogen-producing fuel processing systems that are operated in an inactive state that includes maintaining at least the membrane separation assembly at an elevated temperature while the hydrogen-selective membrane is exposed to oxygen gas and/or other permeability decreasing contaminants/compositions.

The inactive state also may be referred to as a period of inactivity or an inactive period and may include any period of time in which the separation assembly is maintained in the thermally buffered temperature range but the mixed gas stream is not being supplied to the separation assembly. As such, due to the mixed gas stream not being delivered to the separation assembly, it follows that the product hydrogen stream is not being produced by the separation assembly and the byproduct stream is not being produced by the separation assembly. Illustrative, non-exclusive examples of inactive periods according to the present disclosure may include periods of time in which there is no demand for the product hydrogen stream, including periods of time in which there is no demand for the product hydrogen stream by hydrogen-consuming assembly 43, fuel cell stack 40, and/or hydrogen storage device 90; periods of time in which the hydrogen-producing region is not producing the mixed gas stream; periods of time in which the feedstock stream is not being supplied to the hydrogen-producing region; periods of time in which the separation assembly is not producing the product hydrogen stream; and/or periods of time in which there is no demand for the electrical output from the fuel cell stack.

The systems and methods disclosed herein may decrease the long-term impacts on the hydrogen permeability of the hydrogen-selective membrane resulting from maintaining the hydrogen-selective membrane in an inactive state for extended periods of time. Additionally and/or alternatively, the systems and methods disclosed herein may decrease the time required to transition the system from the inactive state to the running state by decreasing the time required to heat the system to its running temperature, which also may be referred to as its steady-state operating temperature, and/or decreasing the amount of time needed for at least the hydrogen-selective membrane of the membrane separation assembly to reach its nominal, rated, desired, and/or steady-state hydrogen permeability or hydrogen-separation rate. These may include systems and methods that decrease the amount of oxygen gas and/or other permeability decreasing contaminants/compositions that may come into contact with the hydrogen-selective membrane and/or systems and methods that periodically remove oxygen gas and/or other permeability decreasing contaminants/compositions that are present within the separation assembly from the separation assembly.

As shown in FIG. 2, isolation devices 96 may be located on one or more of mixed gas conduit 64, product hydrogen conduit 66, and/or byproduct conduit 62 and may decrease the potential for oxygen gas and/or other permeability decreasing contaminants/compositions to diffuse into the separation assembly. Illustrative, non-exclusive examples of isolation devices 96 according to the present disclosure may include any suitable structure adapted to impede the flow of oxygen gas and/or other permeability decreasing contaminants/compositions to the separation assembly and may include any suitable valve 97 and/or sorbent material, or sorbent medium, 98 that is configured to sorb oxygen gas and/or one or more other permeability decreasing contaminants/compositions. It follows that if these contaminants/compositions are prevented from being able to contact the one or more hydrogen-selective membranes, then they cannot decrease the hydrogen permeability of the one or more hydrogen-selective membranes in the thermally buffered separation assembly. Illustrative, non-exclusive examples of suitable sorbents for at least oxygen gas include cerium and/or cerium compounds, low temperature shift catalysts, catalysts and compounds that contain copper and zinc oxides, etc. Such sorbents may be selected to be stable at the thermally buffered temperature at which the hydrogen-selective membranes are maintained in the separation assembly and/or to be stable in the presence of hydrogen gas and/or the mixed gas stream produced by a corresponding hydrogen-producing region. The sorbents, when utilized, may be reduced and/or desorbed by exposure to a reducing gas, such as hydrogen gas, although it additionally or alternatively is within the scope of the present disclosure that the sorbent, when utilized, is contained in a replaceable or disposable cartridge, such as when the sorbent is not, or is not readily, recharged or desorbed.

Figure 3:
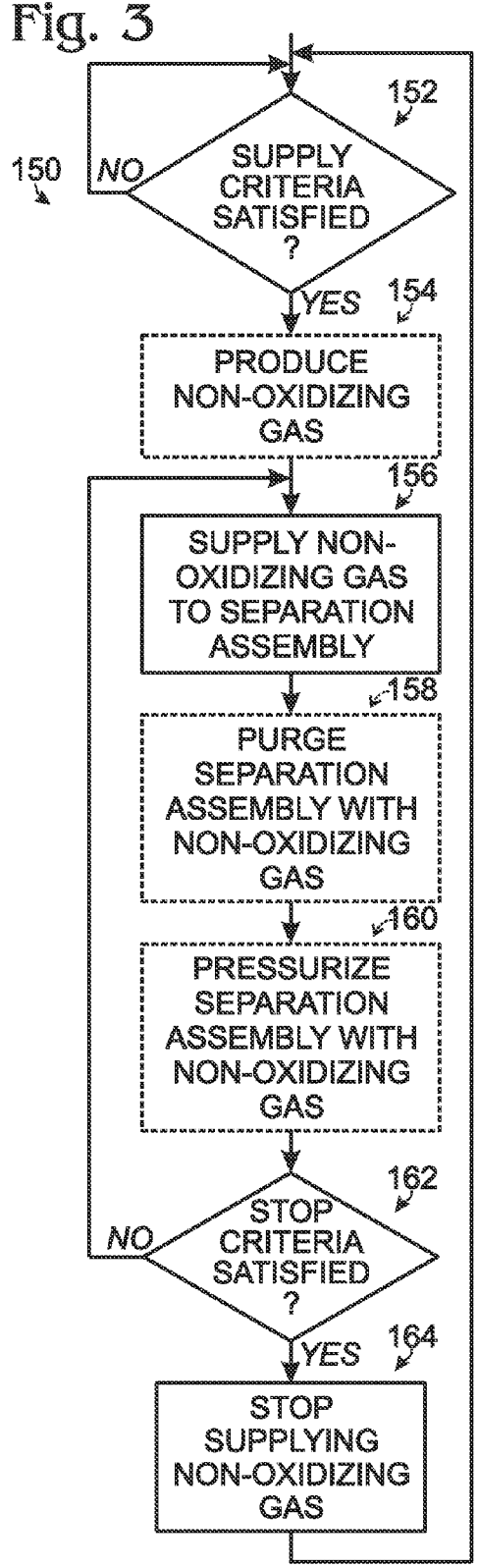
FIG. 3 is a flow chart showing illustrative, non-exclusive examples of methods of reducing hydrogen-sexlective membrane oxidation according to the present disclosure.

A flow chart depicting an illustrative, non-exclusive example of a method 150 of decreasing the amount of oxygen gas and/or other permeability decreasing contaminants/compositions that may come into contact with the hydrogen-selective membrane of a thermally buffered hydrogen-separation assembly is shown schematically in FIG. 3. Method 150 may include the step of determining if one or more supply criteria have been satisfied at 152. If the supply criteria have not been satisfied, the method includes waiting until the supply criteria are satisfied. If the supply criteria have been satisfied, the method optionally includes producing a non-oxidizing gas stream at step 154 and supplying the non-oxidizing gas stream to the separation assembly at 156. The method optionally may include the step of purging the separation assembly with the non-oxidizing gas stream at step 158, and further optionally may include the step of pressurizing the separation assembly with the non-oxidizing gas stream at 160. The method then includes the step of determining if stop criteria have been satisfied at step 162. If the stop criteria have not been satisfied, the method follows the "no" leg, returns to step 156, and continues to supply the non-oxidizing gas stream to the separation assembly. If the stop criteria have been satisfied, the method follows the "yes" leg to step 164, where the flow of the non-oxidizing gas stream is stopped. The method then returns to step 152 and waits for the supply criteria to be satisfied before the method is repeated.

An illustrative, non-exclusive example of a supply criterion according to the present disclosure includes determining that an elapsed time is at least (and/or greater than) a threshold elapsed time. Illustrative, non-exclusive examples of threshold elapsed times according to the present disclosure include threshold elapsed times of greater than 1 hour, such as threshold elapsed times of, or optionally greater than, 1 day, 2 days, 5 days, 7 days, 10 days, 14 days, 18 days, 20 days, 21 days, 25 days, 30 days, 35 days, or threshold elapsed times of greater than 40 days. The elapsed time may be based on a counter that may measure any suitable elapsed time including the elapsed time since the method was performed and/or the elapsed time since a component of the thermally buffered hydrogen-producing fuel processing system was operated. Illustrative, non-exclusive examples of components of the hydrogen-producing fuel processing system include the feedstock supply system, a feedstock supply pump, the hydrogen-producing region, the separation assembly, the fuel cell stack, and/or any other suitable component of thermally buffered hydrogen-producing fuel processing system 12 or hydrogen-producing and consuming assembly 10. The threshold elapsed time may be selected based on determining that the hydrogen permeability of the hydrogen-selective membrane may decrease below an acceptable or threshold level if the threshold elapsed time is exceeded. Thus, the threshold elapsed time also may be considered to indicate that the hydrogen permeability of the hydrogen-selective membrane may decrease below the threshold level at a future time if the threshold time is exceeded.

As an illustrative, non-exclusive example, the threshold elapsed time may be selected such that the decrease in hydrogen permeability of the hydrogen-selective membrane due to membrane exposure to air and/or oxygen gas is less than or equal to a threshold permeability decrease. Illustrative, non-exclusive examples of threshold permeability decreases according to the present disclosure include permeability decreases of less than 50%, including permeability decreases of less than 40%, less than 30%, less than 25%, less than 20%, less than 15%, less than 10%, less than 5%, less than 1%, or less than 0.5%. Additionally or alternatively, the threshold elapsed time may be selected such that there is no measurable decrease in the hydrogen permeability of the hydrogen-selective membrane. As discussed herein, the selected, or permissible, threshold permeability decrease may vary according to a variety of factors, similar to the factors to be considered when selecting a thermally buffered temperature for the membranes. Illustrative, non-exclusive examples of such factors, apart from user and/or design preferences, include the amount of excess membrane surface area compared to the desired hydrogen flux through the membrane and the degree to which the membrane must be able to purify hydrogen gas with its desired permeability after being transitioned to a running operating state.

Another illustrative, non-exclusive example of a supply criterion according to the present disclosure includes determining that a concentration of a contaminant within the thermally buffered hydrogen-producing fuel processing system is greater than an upper concentration threshold. As an illustrative, non-exclusive example, the contaminant may include an oxygen species that may include oxygen gas and/or an oxygen compound and the concentration of the contaminant may be detected within the hydrogen-producing region, within the separation assembly, within the mixed gas conduit, within the product hydrogen conduit, within the byproduct conduit, and/or within the burner assembly.

Other illustrative, non-exclusive examples of supply criteria according to the present disclosure include determining that the hydrogen permeability of the hydrogen-selective membrane is less than a lower hydrogen permeability threshold, determining that a hydration level of the fuel cell stack is less than a lower hydration threshold, determining that an electrical impedance of the fuel cell stack is greater than an upper impedance threshold, and/or determining that a pressure of the gas contained within the separation assembly is less than a lower pressure threshold.

The non-oxidizing gas stream may include any suitable gas stream that does not contain oxygen gas or another gas that may oxidize the hydrogen-selective membrane(s) contained in the separation assembly. Illustrative, non-exclusive examples of non-oxidizing gas streams according to the present disclosure may include blanket or cover gas streams, inert gas streams, and/or reducing gas streams. Illustrative, non-exclusive examples of blanket or cover gas streams include gas streams that are not reactive with the materials contained within the separation assembly. Such gasses may buffer or insulate the materials within the separation assembly, such as the hydrogen-selective membrane, from contact with oxygen in atmospheric air or other materials that may react with the membrane. Illustrative, non-exclusive examples of inert gas streams may include gas streams composed of chemically inert species including nitrogen, argon, helium, or other inert gasses, as well as atmospheric air that has been substantially depleted of oxygen gas. An illustrative, non-exclusive example of atmospheric air that has been substantially depleted of oxygen gas may include a product stream from the combustion of a fuel in air. Illustrative, non-exclusive examples of reducing gas streams may include gas streams that include hydrogen gas, such as the mixed gas stream, product hydrogen stream, the byproduct stream, and/or hydrogen gas from a hydrogen storage device.

Illustrative, non-exclusive examples of producing the non-oxidizing gas stream at step 154 may include supplying the feedstock stream to the hydrogen-producing region to produce the mixed gas stream and/or combusting a fuel in the presence of air to produce an exhaust stream that is substantially depleted of oxygen gas. Supplying the non-oxidizing gas stream to the separation assembly at step 156 may include supplying the non-oxidizing gas stream from any suitable source, illustrative, non-exclusive examples of which include the mixed gas stream and/or the oxygen-depleted air stream discussed herein, as well as a non-oxidizing gas stream supplied from any suitable tank or other storage device.

Illustrative, non-exclusive examples of purging the separation assembly with the non-oxidizing gas stream at step 158 may include any suitable method of purging oxygen gas and/or other permeability decreasing contaminants/compositions from the separation assembly utilizing the non-oxidizing gas stream, including flowing the non-oxidizing gas stream through the separation assembly at a constant flow rate, cyclically flowing the non-oxidizing gas stream through the separation assembly, ramping the flow rate of the non-oxidizing gas stream through the separation assembly, and/or any other suitable flow profile for the non-oxidizing gas stream. Pressurizing the separation assembly with the non-oxidizing gas stream at step 160, when utilized, may include flowing the non-oxidizing gas stream into the separation assembly to increase the pressure therein and fluidly isolating the interior of the separation assembly from other portions of the thermally buffered hydrogen-producing fuel processing system, such as through the use of isolation devices 96 and/or valves 97.

An illustrative, non-exclusive example of stop criteria according to the present disclosure may includes determining that the supplying step has been performed for, or optionally for at least, a threshold supplying time, illustrative, non-exclusive examples of which include supplying times of greater than 1 second, including supplying times of greater than 15 seconds, 30 seconds, 45 seconds, 60 seconds, 90 seconds, 2 minutes, 3 minutes, 4 minutes, 5 minutes, 6 minutes, 7 minutes, 8 minutes, 9 minutes, 10 minutes, 15 minutes, 20 minutes, 25 minutes, 30 minutes, 45 minutes, or threshold supplying times of greater than 60 minutes. Another illustrative, non-exclusive example of stop criteria according to the present disclosure includes determining that the concentration of a contaminant within a portion of the thermally buffered hydrogen-producing fuel processing system is less than a lower concentration threshold, with illustrative, non-exclusive examples of the contaminant and the portion of the thermally buffered hydrogen-producing fuel processing system being discussed herein with reference to the supply criteria. Additional illustrative, non-exclusive examples of stop criteria according to the present disclosure include determining that the hydrogen permeability of the hydrogen-selective membrane is greater than an upper hydrogen permeability threshold, determining that the hydration level of the fuel cell stack is greater than an upper hydration threshold, determining that the humidity of a gas stream within or associated with the fuel cell stack is greater than an upper humidity threshold, determining that the electrical impedance of the fuel cell stack is less than a lower impedance threshold, and/or determining that a pressure of the gas contained within the separation assembly is greater than an upper pressure threshold.

Figure 4:
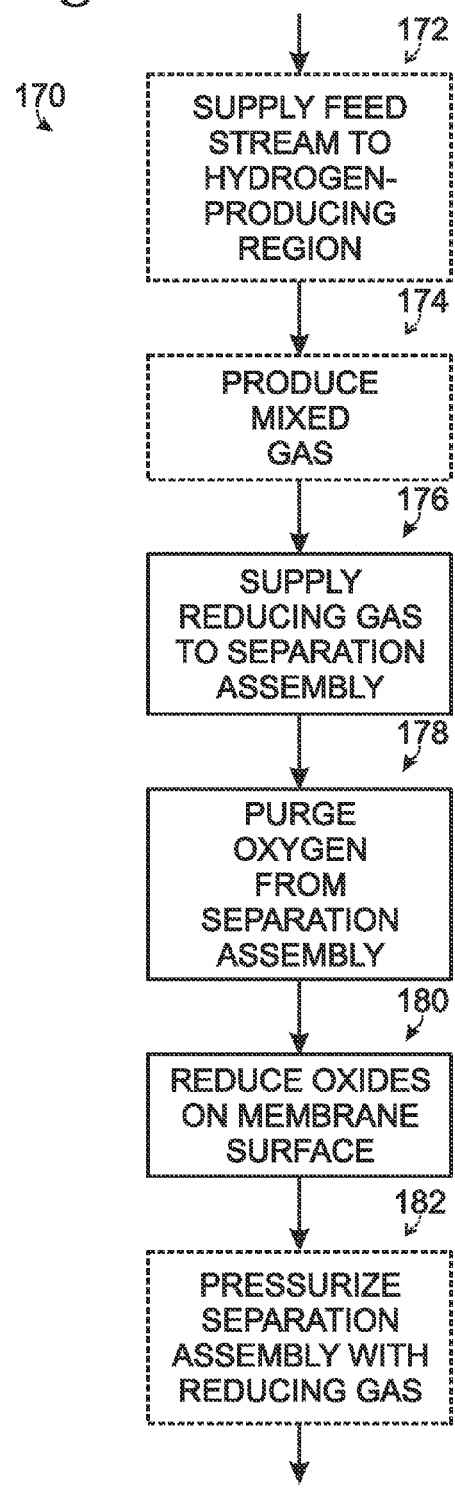
FIG. 4 is a flow chart showing illustrative, non-exclusive examples of methods of removing hydrogen-selective membrane oxidation according to the present disclosure.

A flow chart depicting an illustrative, non-exclusive example of a method 170 of removing oxidation from thermally buffered hydrogen-selective membrane 84 is shown in FIG. 4. The method optionally includes supplying the feed stream to the hydrogen-producing region at step 172 and optionally producing a mixed gas stream within the hydrogen-producing region at step 174. The method further includes supplying a reducing gas stream, which may optionally include the mixed gas stream of step 174, to the separation assembly at step 176, purging oxygen gas from the separation assembly with the reducing gas stream at step 178, and chemically reducing oxides present on the membrane surface at step 180. The method further includes optionally pressurizing the separation assembly with the reducing gas stream at step 182.

Supplying the feed stream to the hydrogen-producing region at step 172 may include (but is not required to include) utilizing controller 100 to control the flow rate of the feedstock stream to the hydrogen-producing region by controlling the various valves, pumps, compressors, and/or mass flow controllers that are included in the feedstock delivery system. Producing the reducing gas stream at step 174 may include reacting the feed stream within the hydrogen-producing region by utilizing any of the reactions discussed in more detail herein to produce the mixed gas stream from the feed stream, where the mixed gas stream is a reducing gas stream containing hydrogen gas.

Supplying the reducing gas stream to the separation assembly at step 176 includes supplying any suitable reducing gas stream from any suitable source to the separation assembly. Illustrative, non-exclusive examples of reducing gas streams according to the present disclosure include the mixed gas stream, the product hydrogen stream, the byproduct stream, and hydrogen gas from a hydrogen storage device and are discussed in more detail herein. It is within the scope of the present disclosure that the reducing gas stream may be produced and/or generated within the thermally buffered hydrogen-producing fuel processing system, such as is described by optional process steps 172 and 174; however, it is also within the scope of the present disclosure that the reducing gas stream may be supplied from another source, such as the sources discussed in more detail herein.

Purging oxygen gas and/or other permeability decreasing contaminants/compositions from the separation assembly at step 178 may include any suitable method of flowing the reducing gas stream through the separation assembly to purge, displace, and/or otherwise remove oxygen gas and/or other permeability decreasing contaminants/compositions present within the separation assembly and may include any of the purge flows discussed herein with reference to step 158 of FIG. 3. Reducing oxides present on the membrane surface at step 180 may include chemically reacting the reducing gas stream with the oxygen gas, other permeability decreasing contaminants/compositions, and/or oxygen or permeability decreasing contaminants/composition present on the membrane surface, desorbing the oxygen gas and/or oxygen or permeability decreasing contaminants/compositions from the membrane, and/or removing the oxygen gas and/or other permeability decreasing contaminants/compositions from the membrane surface. As an illustrative, non-exclusive example, when the reducing gas stream includes hydrogen gas and the hydrogen-selective membrane includes a metallic membrane that includes palladium or a palladium alloy, reducing the oxides present on the membrane surface may include chemically reacting the hydrogen gas with the palladium oxide on the membrane surface, reducing palladium oxide to elemental palladium, and forming water. This water may remain adsorbed on the membrane surface and/or may be desorbed and removed from the membrane surface and/or the separation assembly.

Pressurizing the separation assembly with the reducing gas at step 182 may include maintaining the separation assembly with a positive reducing gas pressure relative to the ambient pressure of the environment surrounding the separation assembly. This may include control of the various isolation devices 96 and/or valves 97 associated with the separation assembly, as discussed in more detail herein with reference to step 160 of FIG. 3.

A flow chart depicting an illustrative, non-exclusive example of a method 200 of removing oxidation from hydrogen-selective membrane 84 that forms part of thermally buffered hydrogen-producing fuel processing system 12 is shown in FIG. 5. The method includes heating a portion of the fuel processing system to a thermally buffered temperature range at step 202 and maintaining the portion of the fuel processing system within the thermally buffered temperature range at step 204. The method further includes determining if supply criteria have been met at step 206. If the supply criteria have not been met, the method follows the "no" leg (or decision path) back to step 204 and continues to maintain the temperature of the portion of the fuel processing system. If the supply criteria have been met, the method follows the "yes" leg to step 208.

At step 208, the method includes supplying the feed stream to the hydrogen-producing region to produce the mixed gas stream. The method further includes supplying the mixed gas stream to the separation assembly at step 210, purging the separation assembly with the mixed gas stream at step 212, and chemically reducing oxides present on the surface of the hydrogen-selective membrane at step 214. The method may optionally include producing the byproduct stream from the separation assembly, combusting the byproduct stream at step 216, producing the product hydrogen stream from the separation assembly, and/or supplying the product hydrogen stream to the fuel cell stack at step 218.

The method further includes determining if stop criteria have been satisfied at step 220. If the stop criteria have not been satisfied, the method follows the "no" leg to step 208 and continues to supply the feed stream to the hydrogen-producing region to produce the mixed gas stream. If the stop criteria have been satisfied, the method follows the "yes" leg to step 222 and stops supplying the feed stream to the hydrogen-producing region. The method then returns to step 204, continues to maintain the fuel processing system at the thermally buffered temperature or temperature range, and waits for the supply criteria to be satisfied before the method is repeated.

The heating and maintaining of steps 202 and 204 may include heating the portion of the fuel processing system to the thermally buffered temperature or temperature range and maintaining the portion of the fuel processing system at the thermally buffered temperature or temperature range while the system is in the inactive state and/or during periods of inactivity. Illustrative, non-exclusive examples of the inactive state and periods of inactivity are discussed in more detail herein. As also discussed in more detail herein, the heating and maintaining steps may include heating and maintaining with electrical heating assembly 93 and/or with burner assembly 92.

Determining if supply criteria have been satisfied at step 206 may include determining that one or more of the supply criteria discussed herein with reference to step 152 of FIG. 3 have been satisfied. Supplying the feed stream to the hydrogen-producing region and producing the mixed gas stream at step 208 may include supplying the feed stream as discussed herein with reference to step 172 of FIG. 4. Supplying the mixed gas stream to the separation assembly at step 210, purging the separation assembly with the mixed gas stream at step 212, and chemically reducing oxides present on the membrane surface at step 214 may be substantially similar to steps 176, 178, and 180 of FIG. 4, respectively. Combusting the byproduct stream at step 216 may include supplying the byproduct stream to a combustion device, such as to burner assembly 92. Determining if stop criteria have been satisfied at step 220 may include determining that one or more of the stop criteria discussed herein with reference to step 162 of FIG. 3 have been satisfied.

The systems and methods disclosed herein have been described largely with reference to a thermally buffered membrane separation assembly and maintaining the hydrogen permeability of the hydrogen-selective membranes contained therein. However, and as discussed herein, these systems and methods may be utilized to maintain, and/or prevent degradation in, the performance of any portion of thermally buffered hydrogen-producing fuel processing system 12 and/or hydrogen-producing and consuming assembly 10 and/or to maintain any portion or component of these systems and assemblies within a thermally buffered temperature range. The systems and methods may additionally or alternatively be described as being configured to prevent, reverse, and/or remedy, a reduction or degradation in the performance of the portion of the thermally buffered hydrogen-producing fuel processing system and/or hydrogen-producing and consuming assembly. As an illustrative, non-exclusive example, the systems and methods disclosed herein may be utilized to ensure periodic operation of the various mechanical devices such as the pumps, compressors, valves, mass flow controllers, and/or other flow regulating devices associated with thermally buffered hydrogen-producing fuel processing system 12 in order to ensure reliable operation of the devices and avoid freezing and/or seizing of these devices. As another illustrative, non-exclusive example, the systems and methods disclosed herein may be utilized to maintain hydration of the fuel cell stack during periods of inactivity. As yet another illustrative, non-exclusive example, the systems and methods disclosed herein may include maintaining any suitable portion of the thermally buffered hydrogen-producing fuel processing system and/or hydrogen-producing and consuming assembly in the thermally buffered state, including the hydrogen-producing region, a portion of the feedstock delivery system, the separation assembly, and/or the fuel cell stack.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B", when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" may mean A alone, B alone, C alone, A and B together, A and C together, B and C together, A, B and C together, and optionally any of the above in combination with at least one other entity.

In the event that any of the references that are incorporated by reference herein define a term in a manner or are otherwise inconsistent with either the non-incorporated portion of the present disclosure or with any of the other incorporated references, the non-incorporated portion of the present disclosure shall control, and the term or incorporated disclosure therein shall only control with respect to the reference in which the term is defined and/or the incorporated disclosure was originally present.

Illustrative, non-exclusive examples of systems and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A. A method for maintaining hydrogen permeability in a thermally buffered hydrogen-producing fuel processing system that includes a feedstock supply system adapted to supply a feedstock stream, a hydrogen-producing region adapted to produce from the feedstock stream a mixed gas stream containing hydrogen gas as a majority component, and a separation assembly including at least one hydrogen-selective membrane and adapted to separate the mixed gas stream into a product hydrogen stream and a byproduct stream, the method comprising:

heating a portion of the thermally buffered hydrogen-producing fuel processing system to a thermally buffered temperature range, wherein the portion of the thermally buffered hydrogen-producing fuel processing system includes at least the hydrogen-selective membrane, and further wherein the thermally buffered temperature range includes a temperature range at which at least a portion of the hydrogen-selective membrane may be oxidized upon exposure to a permeability decreasing contaminant;

maintaining the portion of the thermally buffered hydrogen-producing fuel processing system in the thermally buffered temperature range during a period of inactivity in which the mixed gas stream is not being delivered to the separation assembly; and periodically supplying a non-oxidizing gas stream to the separation assembly during the period of inactivity.

A1. The method of paragraph A, wherein the periodically supplying includes periodically supplying responsive to a supply criterion.

A2. The method of any of paragraphs A-A1, wherein the thermally buffered hydrogen-producing fuel processing system forms a portion of a thermally buffered hydrogen-producing and consuming assembly that further includes a fuel cell stack adapted to receive at least a portion of the product hydrogen stream and produce an electrical output therefrom.

A3. The method of any of paragraphs A-A2, wherein the period of inactivity includes a time period in which there is no demand for the product hydrogen stream, and optionally wherein during the period of inactivity there is no demand for the product hydrogen stream by at least one of a hydrogen consuming device, a hydrogen storage device, and the fuel cell stack.

A4. The method of any of paragraphs A-A3, wherein the period of inactivity includes a time period in which the hydrogen-producing region is not producing the mixed gas stream.

A5. The method of any of paragraphs A-A4, wherein the period of inactivity includes a time period in which the feedstock stream is not being supplied to the hydrogen-producing region.

A6. The method of any of paragraphs A-A5, wherein the period of inactivity includes a time period in which the separation assembly is not producing the product hydrogen stream.

A7. The method of any of paragraphs A-A6, wherein the period of inactivity includes a time period in which there is no demand for the electrical output from the fuel cell stack.

A8. The method of any of paragraphs A-A7, wherein the non-oxidizing gas stream includes, and optionally is, nitrogen gas.

A9. The method of any of paragraphs A-A7, wherein the non-oxidizing gas stream includes, and optionally is, an inert gas.

A10. The method of any of paragraphs A-A7, wherein the non-oxidizing gas stream includes a reducing gas, and optionally wherein the reducing gas is hydrogen gas.

A11. The method of any of paragraphs A-A7 and A10, wherein the non-oxidizing gas stream is a reducing gas stream.

A12. The method of any of paragraphs A-A11, wherein the permeability decreasing contaminant includes, and optionally is, oxygen gas.

A13. The method of any of paragraphs A-A12, wherein the permeability decreasing contaminant includes one or more of an oxide, hydrogen sulfide, a sulfur oxide, carbon monoxide, ammonia, a halogen, sodium chloride, and/or a salt that decreases the hydrogen permeability of the at least one hydrogen-selective membrane when the at least one hydrogen-selective membrane is exposed thereto at the thermally buffered temperature range.

A14. The method of paragraph A13, wherein the reducing gas stream includes hydrogen gas.

A15. The method of paragraph A14, wherein the reducing gas stream includes a hydrogen gas stream provided from the hydrogen storage device.

A16. The method of paragraph A14, wherein the reducing gas stream includes a portion of the mixed gas stream.

A17. The method of paragraph A16, wherein the periodically supplying includes periodically providing the feedstock stream to the hydrogen-producing region to produce the mixed gas stream and providing the mixed gas stream produced by the periodically providing to the separation assembly.

A18. The method of any of paragraphs A-A17, wherein the hydrogen-selective membrane includes palladium, optionally wherein the hydrogen-selective membrane includes a palladium alloy, optionally wherein the palladium alloy includes palladium and copper, and further optionally wherein the palladium alloy includes palladium and 15-45 wt % copper.

A19. The method of any of paragraphs A1-A18, wherein the separation assembly includes a plurality of hydrogen-selective membranes.

A20. The method of any of paragraphs A1-A19, wherein the heating includes heating to a thermally buffered temperature range that is greater than 150° C., and optionally to a thermally buffered temperature range that is at least 175° C., 200° C., 250° C., 300° C., 350° C., 400° C., 450° C., and/or 500° C.

A21. The method of any of paragraphs A-A20, wherein the thermally buffered temperature range includes a thermally warmed temperature range that is less than a steady state operating temperature range for the portion of the thermally buffered hydrogen-producing fuel processing system.

A22. The method of any of paragraphs A-A20, wherein the thermally buffered temperature range includes a thermally primed temperature range that is within a steady state operating temperature range for the portion of the thermally buffered hydrogen-producing fuel processing system.

A23. The method of any of paragraphs A1-A22, wherein the supply criterion includes determining that an elapsed time is greater than a threshold elapsed time.

A24. The method of paragraph A23, wherein the threshold elapsed time is greater than 1 hour, optionally including threshold elapsed times of at least 1 day, 2 days, 5 days, 7 days, 10 days, 14 days, 18 days, 20 days, 21 days, 25 days, 30 days, 35 days, or greater than 40 days.

A25. The method of any of paragraphs A23-A24, wherein the elapsed time includes an elapsed time since the last time that the periodically supplying step was performed.

A26. The method of any of paragraphs A23-A25, wherein the elapsed time includes an elapsed time since a component of the thermally buffered hydrogen-producing fuel processing system was operated.

A27. The method of paragraph A26, wherein the component of the thermally buffered hydrogen-producing fuel processing system includes at least one of a feedstock supply system, a feedstock supply pump, the hydrogen-producing region, the separation assembly, and the fuel cell stack.

A28. The method of any of paragraphs A23-A27, wherein the method further includes detecting a concentration of the permeability decreasing contaminant within the thermally buffered hydrogen-producing fuel processing system, and further wherein the supply criterion includes determining that the concentration of the permeability decreasing contaminant is greater than an upper concentration threshold.

A29. The method of paragraph A28, wherein the permeability decreasing contaminant includes an oxygen species that includes at least one of oxygen gas and an oxygen compound, and further wherein the method includes detecting a concentration of the oxygen species.

A30. The method of paragraph A29, wherein the detecting includes detecting the concentration of the oxygen species in at least one of the thermally buffered hydrogen-producing fuel processing system, the hydrogen-producing region, the separation assembly, a mixed gas conduit, a product hydrogen conduit, and a byproduct conduit.

A31. The method of any of paragraphs A29-A30, wherein the method further includes detecting a parameter indicative of a hydrogen permeability of the hydrogen-selective membrane, and further wherein the supply criterion includes determining that the hydrogen permeability of the hydrogen-selective membrane is less than a lower hydrogen permeability threshold.

A32. The method of any of paragraphs A27-A31, wherein the method further includes detecting a parameter indicative of a hydration level of the fuel cell stack, and further wherein the supply criterion includes determining that the hydration level of the fuel cell stack is less than a lower hydration level threshold.

A33. The method of any of paragraphs A-A32, wherein the method further includes stopping the supplying responsive to a stop criteria.

A34. The method of paragraph A33, wherein the stop criteria includes determining that the supplying step has been performed for at least a threshold supplying time.

A35. The method of paragraph A34, wherein the threshold supplying time is greater than 1 second, optionally including threshold supplying times of greater than 15 seconds, 30 seconds, 45 seconds, 60 seconds, 90 seconds, 2 minutes, 3 minutes, 4 minutes, 5 minutes, 6 minutes, 7 minutes, 8 minutes, 9 minutes, 10 minutes, 15 minutes, 20 minutes, 25 minutes, 30 minutes, 45 minutes, or threshold supplying times of greater than 60 minutes.

A36. The method of any of paragraphs A33-A35, wherein the method further includes detecting a concentration of a contaminant within the thermally buffered hydrogen-producing fuel processing system, and further wherein the stop criteria includes determining that the concentration of the contaminant is less than a lower concentration threshold.

A37. The method of paragraph A36, wherein the contaminant includes an oxygen species that includes at least one of oxygen gas and an oxygen compound, and further wherein the method includes detecting a concentration of the oxygen species.

A38. The method of paragraph A37, wherein the detecting includes detecting the concentration of the oxygen species in at least one of the thermally buffered hydrogen-producing fuel processing system, the hydrogen-producing region, the separation assembly, a mixed gas conduit, a product hydrogen conduit, and a byproduct conduit.

A39. The method of any of paragraphs A33-A38, wherein the method further includes detecting a parameter indicative of a hydrogen permeability of the hydrogen-selective membrane, and further wherein the stop criteria includes determining that the hydrogen permeability of the hydrogen-selective membrane is greater than an upper hydrogen permeability threshold.

A40. The method of any of paragraphs A33-A39, wherein the method further includes detecting a parameter indicative of a hydration level of the fuel cell stack, and further wherein the stop criteria includes determining that the hydration level of the fuel cell stack is greater than an upper hydration level threshold.

A41. The method of paragraph A32 and/or A40, wherein the parameter indicative of the hydration level of the fuel cell stack includes a humidity of a gas stream within the fuel cell stack.

A42. The method of paragraph A32, A40, and/or A41, wherein the parameter indicative of the hydration level of the fuel cell stack includes an electrical impedance of the fuel cell stack.

A43. The method of any of paragraphs A2-A42, wherein the fuel cell stack is adapted to produce the electrical output to satisfy at least a portion of an applied load from an energy-consuming device.

A44. The method of paragraph A43, wherein the thermally buffered hydrogen-producing and consuming assembly is adapted to provide the electrical output to satisfy the applied load when a primary power source is unable to satisfy the applied load.

A45. The method of paragraph A44, wherein the primary power source being unable to satisfy the applied load includes the primary power source being unable to satisfy all of the applied load and optionally includes the primary power source being unable to satisfy any of the applied load.

A46. The method of any of paragraphs A44-A45, wherein the primary power source being unable to satisfy the applied load includes a decrease in a stability of a primary power source electrical output.

A47. The method of any of paragraphs A-A46, wherein the portion of the thermally buffered hydrogen-producing fuel processing system further includes the hydrogen-producing region, and further wherein the heating and maintaining steps include heating the hydrogen-producing region to the hydrogen-producing region thermally buffered temperature range and maintaining the hydrogen-producing region in the hydrogen-producing region thermally buffered temperature range.

A48. The method of any of paragraphs A2-A47, wherein the portion of the thermally buffered hydrogen-producing fuel processing system further includes the fuel cell stack, and further wherein the heating and maintaining steps include heating the fuel cell stack to a fuel cell stack thermally buffered temperature range and maintaining the fuel cell stack in the fuel cell stack thermally buffered temperature range.

A49. The method of any of paragraphs A17-A48, wherein the hydrogen-producing region is adapted to produce the mixed gas stream using at least one of reforming, steam reforming, partial oxidation reforming, autothermal reforming, ammonia decomposition, electrolysis of water, and a water-gas-shift reaction, and further wherein the periodically providing includes supplying the feedstock stream to at least one of a reformer, a steam reformer, a partial oxidation reformer, an autothermal reformer, an ammonia decomposition reactor, an electrolyzer, and a water-gas-shift reactor.

A50. The method of any of paragraphs A2-A49, wherein the fuel cell stack includes at least one of a proton exchange membrane fuel cell, a high temperature proton exchange membrane fuel cell, a low temperature proton exchange membrane fuel cell, a PBI membrane fuel cell, an alkaline fuel cell, and a phosphoric acid fuel cell.

A51. The method of any of paragraphs A-A50, wherein the method further includes sorbing oxidant from the separation assembly and/or the portion of the thermally buffered hydrogen-producing fuel processing system during the period of inactivity with a sorbent material, and optionally wherein the permeability decreasing contaminant is or includes an oxidant, and further optionally wherein the permeability decreasing contaminant is or includes oxygen gas.

A52. The method of paragraph A51, wherein the method further includes periodically replacing the sorbent material.

A53. The method of paragraph A51 or A52, wherein the method further includes periodically recharging the sorbent material.

A54. The method of paragraph A53, wherein the periodically recharging includes delivering a reducing gas stream to the sorbent material to remove sorbed permeability decreasing contaminant therefrom, and optionally to remove sorbed oxidant therefrom, and further optionally to remove sorbed oxygen gas therefrom.

A55. The method of paragraph A53 or A54, wherein the periodically recharging includes periodically desorbing sorbed permeability decreasing contaminant from the sorbent material, and optionally desorbing sorbed oxidant from the sorbent material, and further optionally desorbing sorbed oxygen gas from the sorbent material.

A56. The method of any of paragraphs A51-A55, wherein the sorbent material includes at least one of cerium, a cerium compound, and a low temperature shift catalyst.

A57. A method for maintaining hydrogen permeability of a hydrogen-selective membrane included in a membrane separation assembly that forms a part of a fuel cell system, the fuel cell system further including a hydrogen-producing region adapted to accept a feed stream and produce a mixed gas stream containing hydrogen gas therefrom and supply it to the membrane separation assembly and a fuel cell stack adapted to receive a product hydrogen stream produced by the separation assembly and produce an electrical output therefrom to satisfy an applied load from an energy-consuming device, the method comprising:

periodically supplying a non-oxidizing gas stream to the separation assembly during periods in which there is no demand for production of the electrical output from the fuel cell stack to satisfy the applied load from the energy-consuming device; and purging a permeability decreasing contaminant from the separation assembly with the non-oxidizing gas stream.

A58. The method of paragraph A57, wherein the permeability decreasing contaminant includes oxygen gas.

A59. The method of paragraph A57, wherein the permeability decreasing contaminant includes one or more of an oxide, hydrogen sulfide, a sulfur oxide, carbon monoxide, ammonia, a halogen, sodium chloride, and/or a salt that decreases the hydrogen permeability of the at least one hydrogen-selective membrane when the at least one hydrogen-selective membrane is exposed thereto at the thermally buffered temperature range.

A60. The method of any of paragraphs A57-59, wherein the non-oxidizing gas stream includes at least one of a blanket gas stream, a cover gas stream, and an inert gas stream.

A61. The method of any of paragraphs A57-60, wherein the non-oxidizing gas stream includes a reducing gas stream.

A62. The method of paragraph A61, wherein the reducing gas stream includes hydrogen gas, and optionally wherein the reducing gas stream includes at least one of the mixed gas stream and hydrogen gas provided from a hydrogen storage device.

A63. The method of paragraphs A57-A62, wherein the fuel cell system is adapted to provide the electrical output when a primary power source is unable to satisfy the applied load.

A64. The method of any of paragraphs A57-A63, wherein the method further includes heating a portion of the fuel cell system to a thermally buffered temperature range, wherein the portion of the fuel cell system includes at least the hydrogen-selective membrane, and further wherein the thermally buffered temperature range includes a temperature range at which at least a portion of the hydrogen-selective membrane may be oxidized upon exposure to oxygen gas.

A65. The method of paragraph A64, wherein the method further includes maintaining the fuel cell system in the thermally buffered temperature range during at least one of time periods in which there is no demand for production of the electrical output to satisfy the applied load from the energy-consuming device, time periods in which there is no demand for the electrical output from the fuel cell stack, time periods in which there is no demand for the product hydrogen stream, time periods in which the hydrogen-producing region is not producing the mixed gas stream, time periods in which the feed stream is not being supplied to the hydrogen-producing region, and time periods in which the separation assembly is not producing the product hydrogen stream.

A66. The method of any of paragraphs A57-A65, wherein the method further includes chemically reducing oxides present on the hydrogen-selective membrane.

A67. The method of any of paragraphs A57-A66, wherein the method further includes pressurizing the separation assembly with the non-oxidizing gas stream, and optionally wherein the periodically supplying includes periodically supplying responsive to a pressure of the non-oxidizing gas in the separation assembly falling below a threshold level.

A68. The method of any of paragraphs A57-A67, wherein the method further includes sorbing permeability decreasing contaminant from the separation assembly and/or the portion of the thermally buffered hydrogen-producing fuel processing system during the period of inactivity with a sorbent material, and optionally wherein the permeability decreasing contaminant is or includes an oxidant, and further optionally wherein the permeability decreasing contaminant is or includes oxygen gas.

A69. The method of paragraph A68, wherein the method further includes periodically replacing the sorbent material.

A70. The method of paragraph A68 or A69, wherein the method further includes periodically recharging the sorbent material.

A71. The method of paragraph A70, wherein the periodically recharging includes delivering a reducing gas stream to the sorbent material to remove sorbed permeability decreasing contaminant therefrom, and optionally to remove sorbed oxidant therefrom, and further optionally to remove sorbed oxygen gas therefrom.

A72. The method of paragraph A70 or A71, wherein the periodically recharging includes periodically desorbing sorbed permeability decreasing contaminant from the sorbent material, and optionally desorbing sorbed oxidant from the sorbent material, and further optionally desorbing sorbed oxygen gas from the sorbent material.

A73. The method of any of paragraphs A68-A72, wherein the sorbent material includes at least one of cerium, a cerium compound, and a low temperature shift catalyst.

A74. The method of any of paragraphs A57-A73 performed in any permissible combination with any of the methods of paragraphs A-A56.

A75. A method for maintaining hydrogen permeability in a thermally buffered hydrogen-producing fuel processing system that includes a feedstock supply system adapted to supply a feedstock stream, a hydrogen-producing region adapted to produce from the feedstock stream a mixed gas stream containing hydrogen gas as a majority component, and a separation assembly including at least one hydrogen-selective membrane and adapted to separate the mixed gas stream into a product hydrogen stream and a byproduct stream, the method comprising:

heating a portion of the thermally buffered hydrogen-producing fuel processing system to a thermally buffered temperature range, wherein the portion of the thermally buffered hydrogen-producing fuel processing system includes at least the hydrogen-selective membrane, and further wherein the thermally buffered temperature range includes a temperature range at which at least a portion of the hydrogen-selective membrane may be oxidized upon exposure to a permeability decreasing contaminant;

maintaining the portion of the thermally buffered hydrogen-producing fuel processing system in the thermally buffered temperature range during a period of inactivity in which the mixed gas stream is not being delivered to the separation assembly; and sorbing permeability decreasing contaminant from the portion of the thermally buffered hydrogen-producing fuel cell system during the period of inactivity.

A76. The method of paragraph A75, wherein the portion includes the separation assembly.

A77. The method of paragraph A75 or A76, wherein the permeability decreasing contaminant is or includes an oxidant, and further optionally wherein the permeability decreasing contaminant is or includes oxygen gas.

A78. The method of any of paragraphs A75-A77, wherein the method further includes periodically replacing the sorbent material.

A79. The method of any of paragraphs A75-A78, wherein the method further includes periodically recharging the sorbent material.

A80. The method of paragraph A79, wherein the periodically recharging includes delivering a reducing gas stream to the sorbent material to remove sorbed permeability decreasing contaminant therefrom, and optionally to remove sorbed oxidant therefrom, and further optionally to remove sorbed oxygen gas therefrom.

A81. The method of paragraph A79 or A80, wherein the periodically recharging includes periodically desorbing sorbed permeability decreasing contaminant from the sorbent material, and optionally desorbing sorbed oxidant from the sorbent material, and further optionally desorbing sorbed oxygen gas from the sorbent material.

A82. The method of any of paragraphs A75-A81, wherein the sorbent material includes at least one of cerium, a cerium compound, and a low temperature shift catalyst.

B. A thermally buffered fuel cell system adapted to provide auxiliary power to satisfy an applied load from an energy-consuming device when a primary power source is unable to satisfy the applied load, the thermally buffered fuel cell system comprising:

a hydrogen-producing region adapted to produce a mixed gas stream from a feedstock stream;

a separation assembly including at least one hydrogen-selective membrane and adapted to receive at least a portion of the mixed gas stream and to separate the mixed gas stream into a product hydrogen stream and a byproduct stream;

a fuel cell stack adapted to receive at least a portion of the product hydrogen stream and produce an electrical output therefrom; and a controller configured to:
heat at least a portion of the fuel cell system to a thermally buffered temperature range;
maintain the portion of the fuel cell system in the thermally buffered temperature range during periods in which there is no demand for the fuel cell system to generate the electrical output, the hydrogen-producing region is not producing the mixed gas stream, and the primary power source is providing a primary power output to satisfy the applied load;

selectively deliver the feedstock stream to the hydrogen-producing region to produce the mixed gas stream; and selectively provide the mixed gas stream to the separation assembly during periods in which the primary power source is providing the primary power output to satisfy the applied load, wherein the controller is configured to selectively deliver and selectively provide responsive to a supply criterion indicative of at least one of a decrease in the hydrogen permeability of the hydrogen-selective membrane and a future decrease in the hydrogen permeability of the hydrogen-selective membrane.

B1. The fuel cell system of paragraph B, wherein the controller is configured to perform any of the methods of paragraphs A-A82.

C. The use of any of the methods of paragraphs A-A82 with the system of any of paragraphs B or B1.

C1. The use of the fuel cell system of paragraph B or B1 to perform the method of any of paragraphs A-A82.

D. A fuel cell system including a controller configured to perform any of the methods of paragraphs A-A82.

E. A fuel processing system, comprising:

a hydrogen-producing region adapted to produce a mixed gas stream from a feedstock stream;

a separation assembly including at least one hydrogen-selective membrane and adapted to receive at least a portion of the mixed gas stream and to separate the mixed gas stream into a product hydrogen stream and a byproduct stream; and a controller configured to perform the methods of any of paragraphs A-A82:

INDUSTRIAL APPLICABILITY

The systems and methods for maintaining hydrogen-selective membranes during periods of inactivity disclosed herein are applicable to the hydrogen-processing and fuel cell industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A method for maintaining hydrogen permeability in a thermally buffered hydrogen-producing fuel processing system that includes a feedstock supply system adapted to supply a feedstock stream, a hydrogen-producing region adapted to produce from the feedstock stream a mixed gas stream containing hydrogen gas as a majority component, and a separation assembly including at least one hydrogen-selective membrane and adapted to separate the mixed gas stream into a product hydrogen stream and a byproduct stream, the method comprising:

heating a portion of the thermally buffered hydrogen-producing fuel processing system to a thermally buffered temperature range, wherein the portion of the thermally buffered hydrogen-producing fuel processing system includes at least the hydrogen-selective membrane, and further wherein the thermally buffered temperature range includes a temperature range at which at least a portion of the hydrogen-selective membrane may be oxidized upon exposure to an oxidant;

maintaining the portion of the thermally buffered hydrogen-producing fuel processing system in the thermally buffered temperature range during a period of inactivity; and periodically supplying a non-oxidizing gas stream to the separation assembly during the period of inactivity to maintain the at least one hydrogen-selective membrane in a non-oxidizing environment, wherein the periodically supplying includes periodically supplying responsive to a supply criterion.

2. The method of claim 1, wherein the thermally buffered hydrogen-producing fuel processing system forms a portion of a thermally buffered hydrogen-producing and consuming assembly that further includes a fuel cell stack adapted to receive at least a portion of the product hydrogen stream and produce an electrical output therefrom.

3. The method of claim 2, wherein the fuel cell stack is adapted to produce the electrical output to satisfy at least a portion of an applied load from an energy-consuming device.

4. The method of claim 3, wherein the thermally buffered hydrogen-producing and consuming assembly is adapted to provide the electrical output to satisfy the applied load when a primary power source is unable to satisfy the applied load.

5. The method of claim 2, wherein the period of inactivity includes a time period in which there is no demand for the electrical output from the fuel cell stack.

6. The method of claim 1, wherein the period of inactivity includes a time period in which there is no demand for the product hydrogen stream.

7. The method of claim 1, wherein the oxidant includes oxygen gas.

8. The method of claim 1, wherein the non-oxidizing gas stream is a reducing gas stream.

9. The method of claim 8, wherein the reducing gas stream includes hydrogen gas.

10. The method of claim 9, wherein the period of inactivity includes a period in which the hydrogen-producing region is not producing the mixed gas stream, and further wherein the reducing gas stream includes a portion of the mixed gas stream.

11. The method of claim 1, wherein the periodically supplying includes periodically providing the feedstock stream to the hydrogen-producing region to produce the mixed gas stream and providing the mixed gas stream produced by the periodically providing to the separation assembly.

12. The method of claim 1, wherein the hydrogen-selective membrane includes at least one of palladium and a palladium alloy.

13. The method of claim 1, wherein the heating includes heating to a thermally buffered temperature range that is at least 150° C.

14. The method of claim 1, wherein the thermally buffered temperature range includes a thermally warmed temperature range that is less than a steady state operating temperature range for the portion of the thermally buffered hydrogen-producing fuel processing system.

15. The method of claim 1, wherein the thermally buffered temperature range includes a thermally primed temperature range that is within a steady state operating temperature range for the portion of the thermally buffered hydrogen-producing fuel processing system.

16. The method of claim 1, wherein the supply criterion includes determining that an elapsed time is greater than a threshold elapsed time.

17. The method of claim 1, wherein the method further includes stopping the supplying responsive to a stop criteria, and further wherein the stop criteria includes determining that the supplying step has been performed for at least a threshold supplying time.

18. The method of claim 1, wherein the portion of the thermally buffered hydrogen-producing fuel processing system further includes the hydrogen-producing region, and further wherein the heating and maintaining steps include heating the hydrogen-producing region to the hydrogen-producing region thermally buffered temperature range and maintaining the hydrogen-producing region in the hydrogen-producing region thermally buffered temperature range.

19. The method of claim 1, wherein the method further includes sorbing oxidant from the portion of the thermally buffered hydrogen-producing fuel processing system during the period of inactivity.

20. A method for maintaining hydrogen permeability of a hydrogen-selective membrane included in a membrane separation assembly that forms a part of a fuel cell system, the fuel cell system further including a hydrogen-producing region adapted to accept a feed stream and produce a mixed gas stream containing hydrogen gas therefrom and supply it to the membrane separation assembly and a fuel cell stack adapted to receive a product hydrogen stream produced by the membrane separation assembly and produce an electrical output therefrom to satisfy an applied load from an energy-consuming device, the method comprising:
periodically supplying a non-oxidizing gas stream to the membrane separation assembly during periods in which there is no demand for production of the electrical output from the fuel cell stack to satisfy the applied load from the energy-consuming device; and
purging one or more oxidants from the membrane separation assembly with the non-oxidizing gas stream.

21. The method of claim 20, wherein the non-oxidizing gas stream includes a reducing gas stream.

22. The method of claim 21, wherein the reducing gas stream includes at least one of the mixed gas stream and hydrogen gas provided from a hydrogen storage device.

23. The method of claim 20, wherein the one or more oxidants includes oxygen gas.

24. The method of claim 20, wherein the fuel cell system is adapted to provide the electrical output when a primary power source is unable to satisfy the applied load.

25. The method of claim 20, wherein the method further includes heating a portion of the fuel cell system to a thermally buffered temperature range, wherein the portion of the fuel cell system includes at least the hydrogen-selective membrane, and further wherein the thermally buffered temperature range includes a temperature range at which at least a portion of the hydrogen-selective membrane may be oxidized upon exposure to oxygen gas.

26. The method of claim 25, wherein the method further includes maintaining the fuel cell system in the thermally buffered temperature range during time periods in which there is no demand for the electrical output from the fuel cell stack.

27. The method of claim 20, wherein the method further includes chemically reducing oxides present on the hydrogen-selective membrane.

28. The method of claim 20, wherein the method further includes sorbing oxidant from within the membrane separation assembly during a period of inactivity.

29. A method for maintaining hydrogen permeability in a thermally buffered hydrogen-producing fuel processing system that includes a feedstock supply system adapted to supply a feedstock stream, a hydrogen-producing region adapted to produce from the feedstock stream a mixed gas stream containing hydrogen gas as a majority component, and a separation assembly including at least one hydrogen-selective membrane and adapted to separate the mixed gas stream into a product hydrogen stream and a byproduct stream, the method comprising:
heating a portion of the thermally buffered hydrogen-producing fuel processing system to a thermally buffered temperature range, wherein the portion of the thermally buffered hydrogen-producing fuel processing system includes at least the hydrogen-selective membrane, and further wherein the thermally buffered temperature range includes a temperature range at which at least a portion of the hydrogen-selective membrane may be oxidized upon exposure to an oxidant;
maintaining the portion of the thermally buffered hydrogen-producing fuel processing system in the thermally buffered temperature range during a period of inactivity in which the mixed gas stream is not being delivered to the separation assembly; and
sorbing oxidant from a retentate side of the separation assembly with a sorbent material during the period of inactivity.

30. The method of claim 29, wherein the method further includes periodically replacing the sorbent material.

31. The method of claim 29, wherein the method further includes periodically recharging the sorbent material.

32. The method of claim 31, wherein the periodically recharging includes delivering a reducing gas stream to the sorbent material to remove sorbed oxidant therefrom.

33. The method of claim 29, wherein the sorbent material includes at least one of cerium, a cerium compound, and a low temperature shift catalyst.

* * * * *